(12) United States Patent
Keister

(10) Patent No.: US 9,580,343 B2
(45) Date of Patent: Feb. 28, 2017

(54) TREATMENT OF GAS WELL PRODUCTION WASTEWATERS

(71) Applicant: ProChemTech International, Inc., Brockway, PA (US)

(72) Inventor: Timothy Edward Keister, Brockway, PA (US)

(73) Assignee: ProChemTech International, Inc., Brockway, PA (US)

( * ) Notice: Subject to any disclaimer, the term of this patent is extended or adjusted under 35 U.S.C. 154(b) by 179 days.

(21) Appl. No.: 14/530,926

(22) Filed: Nov. 3, 2014

(65) Prior Publication Data

US 2015/0060368 A1 Mar. 5, 2015

Related U.S. Application Data

(63) Continuation-in-part of application No. 13/222,481, filed on Aug. 31, 2011, now Pat. No. 8,877,690.

(51) Int. Cl.

| | | |
|---|---|---|
| *C02F 9/00* | (2006.01) | |
| *B01D 9/00* | (2006.01) | |
| *C02F 1/52* | (2006.01) | |
| *C02F 1/04* | (2006.01) | |
| *C01D 3/06* | (2006.01) | |
| *C01B 17/96* | (2006.01) | |
| *C01F 11/46* | (2006.01) | |
| *C02F 101/20* | (2006.01) | |
| *C02F 101/12* | (2006.01) | |
| *C02F 103/10* | (2006.01) | |
| *C02F 101/00* | (2006.01) | |

(Continued)

(52) U.S. Cl.
CPC ............. *C02F 9/00* (2013.01); *B01D 9/0018* (2013.01); *C01B 17/96* (2013.01); *C01D 3/06* (2013.01); *C01F 11/462* (2013.01); *C01P 2006/80* (2013.01); *C02F 1/048* (2013.01); *C02F 1/5236* (2013.01); *C02F 1/5245* (2013.01); *C02F 11/122* (2013.01); *C02F 2101/006* (2013.01); *C02F 2101/12* (2013.01); *C02F 2101/20* (2013.01); *C02F 2101/206* (2013.01); *C02F 2103/10* (2013.01); *C02F 2103/36* (2013.01); *C02F 2209/06* (2013.01)

(58) Field of Classification Search
USPC .................. 210/638, 665, 710; 507/200
See application file for complete search history.

(56) References Cited

U.S. PATENT DOCUMENTS 4,648,333 A 3/1987 Mudd et al.
4,895,665 A 1/1990 Colelli et al.
(Continued)

*Primary Examiner* — Dirk Bass
(74) *Attorney, Agent, or Firm* — Kilyk & Bowersox, P.L.L.C.

(57) ABSTRACT

A method of treating a wastewater is provided and can be used, for example, to treat a gas well production wastewater to form a wastewater brine. The method can involve crystallizing sodium chloride by evaporation of the wastewater brine with concurrent production of a liquor comprising calcium chloride solution. Bromine and lithium can also be recovered from the liquor in accordance with the teachings of the present invention. Various metal sulfates, such as barium sulfate and strontium sulfate, can be removed from the wastewater in the production of the wastewater brine. Sources of wastewater can include gas well production wastewater and hydrofracture flowback wastewater.

13 Claims, 10 Drawing Sheets

(51) Int. Cl.
　　　*C02F 103/36*　　　(2006.01)
　　　*C02F 11/12*　　　(2006.01)

(56) References Cited

U.S. PATENT DOCUMENTS

| | | |
|---|---|---|
| 5,011,610 A | 4/1991 | Martin et al. |
| 5,385,650 A | 1/1995 | Howarth et al. |
| 5,422,012 A | 6/1995 | Adams |
| 7,244,361 B2 | 7/2007 | Dwyer |
| 7,255,793 B2 | 8/2007 | Cort |
| 7,322,152 B2 | 1/2008 | Hill |
| 7,393,454 B2 | 7/2008 | Basset et al. |
| 7,438,142 B2 | 10/2008 | Butler et al. |
| 7,497,954 B2 | 3/2009 | Ivan et al. |
| 7,520,342 B2 | 4/2009 | Butler et al. |
| 7,527,736 B2 | 5/2009 | Shafer et al. |
| 2007/0102154 A1 | 5/2007 | Grott |
| 2009/0069176 A1 | 3/2009 | Hernandez et al. |
| 2009/0184054 A1 | 7/2009 | Crawford et al. |
| 2009/0261042 A1 | 10/2009 | Semiat et al. |
| 2010/0125044 A1 | 5/2010 | Keister |
| 2011/0104038 A1* | 5/2011 | DiTommaso ........... C02F 1/048 423/430 |
| 2013/0048562 A1 | 2/2013 | Keister |
| 2014/0286854 A1 | 9/2014 | Keister |

\* cited by examiner

TREATMENT OF GAS WELL PRODUCTION WASTEWATERS

CROSS-REFERENCE TO RELATED APPLICATION

The present application is a continuation-in-part of U.S. patent application Ser. No. 13/222,481, filed Aug. 31, 2011, which issued as U.S. Pat. No. 8,877,690 B2 on Nov. 4, 2014, both of which are incorporated herein in their entireties by reference.

FIELD

The present teachings relate to methods for treating wastewater, and more specifically, methods for treating gas well hydrofracture and production wastewaters.

BACKGROUND

While various individual methods are available for addressing specific constituents of gas well wastewaters and for treatment of abandoned coal mine acid drainage (AMD), there exists no process to treat, or co-treat, such wastewaters in a manner that renders such wastewaters suitable for recycle or reuse.

The drilling of natural gas wells and subsequent on-going recovery and/or production of natural gas produces a number of wastewater streams commonly identified as completion, hydrofracture flowback, and production waters. Drilling of a gas well also requires a substantial amount of water for makeup of the virgin, prior to use, drilling muds, completion, and hydrofracture waters. It is estimated that a typical deep horizontal gas well requires from 3 to 10 million gallons of hydrofracture water for completion/hydrofracture and generates an equal amount of hydrofracture flowback and production wastewaters. Hydrofracture flowback, generally 10 to 25% of the hydrofracture water volume, is now commonly filtered, diluted with fresh water, and reused for makeup of hydrofracture water. Production wastewater is contained in the produced gas and a typical gas well will produce from 100 to 4,000 gallons per day for the production life of the gas well.

With significant new large drilling activities linked to tight gas shale formations such as the Marcellus Shale in Pennsylvania, the provision of sufficient water for new drilling activities and subsequent disposal of large volumes of wastewater has become a critical issue. The wastewaters produced by gas well drilling, completion, and production activities present some unusual and difficult problems with regard to treatment suitable to enable disposal by discharge to surface waters.

Recent disposal activities have included co-treatment in publicly owned treatment plants (POTW), the use of industrial treatment systems, and the use of a limited number of purpose built treatment plants. These methods of disposal all treat and discharge treated wastewater to surface waters but are capable of removing only a limited number and amount of the pollutants typically present. POTW are limited in that the amount of wastewater that can be treated is limited by the barium content, which can affect the production of a sludge characterized as a hazardous waste. Other processes are limited in that they cannot obtain a substantial reduction in dissolved solids.

In 2008, the Monongahela River in Western Pennsylvania experienced a rapid rise in dissolved solids content which severely disrupted many public water supplies and industrial operations. The cause was found to be the discharge of gas well wastewaters treated by many POTW situated along the river.

The regulatory agency, Pennsylvania Department of Environmental Protection, (PADEP) subsequently placed a very restrictive limit of 500 mg/l on dissolved solids discharges to surface waters resulting from treatment of gas well wastewaters. This limit went into effect on Jan. 1, 2011, for all new dischargers with a starting discharge date of Apr. 11, 2009.

Table 1 below shows analytical data on a typical hydrofracture flowback wastewater. As can be seen, it is extremely high in dissolved solids, toxic barium, and scale formers such as calcium, iron, magnesium, and strontium.

TABLE 1

| Parameter | Analytical Result |
|---|---|
| conductivity - mmhos | 152,000 |
| dissolved solids - mg/l | 175,268 |
| total suspended solids - mg/l | 416 |
| biological oxygen demand, 5 day - mg/l | 489 |
| methyl blue active substances - mg/l | 0.939 |
| chloride - mg/l | 73,370 |
| oil/grease - mg/l | 38 |
| total organic carbon - mg/l | 114.5 |
| ammonia-N - mg/l | 83.5 |
| chemical oxygen demand - mg/l | 600 |
| total hardness - mg/l | 39,100 |
| strontium - mg/l | 6,830 |
| barium - mg/l | 3,310 |
| calcium - mg/l | 14,100 |
| iron - mg/l | 52.5 |
| magnesium - mg/l | 938 |
| manganese - mg/l | 5.17 |

In addition to these major constituents, low levels of bromide, lithium, copper, nickel, zinc, lead, and other assorted heavy metals are also common.

With the development of means to simply filter hydrofracture flowback for immediate reuse as hydrofracture makeup waters, the remaining major problem presented by development of the Marcellus gas field is the production wastewater. As shown by the following analytical data on a typical production wastewater, it is extremely high in dissolved solids, toxic barium, and other elements such as calcium, magnesium, and strontium, for example, as shown in Table 2 below.

TABLE 2

| Parameter | Analytical Result |
|---|---|
| dissolved solids - mg/l | 202,690 |
| chloride - mg/l | 180,000 |
| ammonia-N - mg/l | 132.2 |
| strontium - mg/l | 3,600 |
| barium - mg/l | 6,000 |
| calcium - mg/l | 17,500 |
| iron - mg/l | 100 |
| magnesium - mg/l | 1,800 |
| manganese - mg/l | 3.5 |
| sodium mg/l | 80,000 |
| lithium mg/l | 189 |
| bromide mg/l | 812 |

Trace levels of radioactives, such as uranium and radium, are also present as well as lead.

The only known technology for treatment of such a wastewater to meet the current PADEP dissolved solids limit for surface water discharge is evaporation. Prior to evaporation, the toxic barium would have to be removed to prevent the resultant dry salt cake from being a hazardous waste while the scale formers calcium, magnesium, iron, and strontium would have to be removed to prevent scale formation on heat transfer surfaces.

An alternative to trying to treat for surface water discharge, or pretreat and evaporate, would be to treat the wastewater for recycle as hydrofracture makeup water. From various sources in the gas well hydrofracture service industry, it appears that the specific parameters shown in Table 3 below would be required of water to be used for makeup of hydrofracture water.

TABLE 3

| Parameter | Recommended Values |
| --- | --- |
| Scale Ions - aluminum, barium, calcium, iron, magnesium, manganese, and strontium | maximum of 2,500 mg/l as CaCO3 |
| Dissolved Solids | maximum of 50,000 mg/l |
| Iron | maximum of 20 mg/l |
| Suspended Solids | none |
| Calcium | maximum 350 mg/l as CaCO3 |

The makeup water would need to be substantially free of microorganisms to prevent growth of microorganisms in the fractured gas bearing strata.

There is currently no known technology for treatment of such a wastewater to comply with current PADEP dissolved solids limit for surface water discharge. Simple evaporation to reduce the liquid to a solid is not a viable method due to the presence of toxic barium, which renders the produced solid a "hazardous" waste, making disposal extremely costly. While the toxic barium can be removed by the Sequential Precipitation process taught in U.S. Pat. No. 8,834,726 B2, which is incorporated herein in its entirety by reference, evaporation of the remaining liquid results in production of a mixed calcium, magnesium, and sodium chloride salt, which is highly deliquescent and cannot be disposed of by landfill.

The sole current alternative is to treat the production wastewater for recycle as hydrofracture makeup water. That process is sequential precipitation and is described in U.S. Pat. No. 8,834,726 B2. Unfortunately, production wastewater will be generated in volumes far exceeding the needs for hydrofracture makeup water considering that producing gas fields do not require further hydrofracture, other than on an infrequent basis with intervals measured in tens of years. A second problem with this process is that the calcium and magnesium are removed from the wastewater as calcium carbonate and magnesium hydroxide respectively producing large amounts of a low value product, calcium carbonate or limestone, and consuming large amounts of an expensive reactant, sodium carbonate.

Moreover, the pre-treatment of gas and oil well wastewater utilizing dual channel oil and a solids separator must be designed to American Petroleum Institute standards and is required to remove gross solids and free hydrocarbons from the wastewater prior to further processing. The present invention addresses these requirements.

SUMMARY

To address these and other problems, the present teachings provide a fractional crystallization process wherein brine produced in a first barium removal step such as that described in U.S. Pat. No. 8,834,726 B2, can be further treated by evaporation to the point where sodium chloride almost completely fractionally crystallizes from the liquor. No additional costly reagents are required and the produced calcium chloride solution, crystalline sodium chloride, and distilled water are current commodities. The present teachings can provide a complete process, equipment, and chemical additions, required to treat gas well production wastewater with complete resource recovery, eliminating the need for any disposal of sludge or non-compliant waters.

According to various embodiments of the present invention, a method of treating a gas well hydrofracture flowback and/or production wastewater (production wastewater) is provided that comprises recycling slurry of barite sludge and wastewater brine for further precipitation of barium sulfate, before separating the barite sludge from the brine. The method comprises contacting a production wastewater containing barium, with a source of sulfate ions, in a first tank and under conditions to precipitate barium sulfate. The contacting can comprise adding from about 100% to about 150% of a stoichiometrically equivalent amount of sulfate ions to the first tank, based on the amount of barium ions in the first tank. Barium sulfate can then be precipitated from the production wastewater in the first tank to form a slurry of precipitated barium sulfate and a wastewater brine. The wastewater brine can comprise sodium, magnesium, strontium, and calcium chlorides. The slurry is then pumped or otherwise moved to a second tank. In the second tank, the slurry can be mixed with a second reagent, for example, a pH-adjusting reagent such as sodium hydroxide. Optionally, slurry can then be pumped or otherwise moved to a third tank wherein the slurry can be mixed with a third agent or reagent, for example, a flocculating agent. The treated slurry can then be recycled by being pumped or otherwise moved back to the first tank, and the precipitating, pH-adjusting, and optional flocculation can be repeated one or more times to form a refined wastewater brine.

The method can further comprise evaporating the refined wastewater brine to form water and evaporation products, for example, evaporation products comprising crystalline sodium chloride. The evaporating can further comprise forming a liquor comprising from about 25% by weight to about 60% by weight calcium chloride based on the total weight of the liquor. The method can further comprise adjusting the pH of the refined wastewater brine to be between 6.5 and 7.5, before the evaporating. The method can further comprise filtering the evaporation product to form a retentate comprising crystalline sodium chloride, and a filtrate comprising the liquor, after which the retentate can be washed with saturated sodium chloride brine and dried. The method can further comprise cooling the evaporation product prior to the filtering. The method can further comprise measuring the specific gravity of the filtrate, and if the specific gravity is not high enough, the filtrate can be further processed, for example, by further evaporating, until a desired specific gravity is achieved.

In some embodiments, the method can further comprise moving the refined wastewater brine to a fourth mixing tank and adding from about 100% to about 150% of a stoichiometrically equivalent amount of sulfate ions to the fourth mixing tank, based on the amount of strontium ions in the fourth mixing tank. Strontium sulfate can then be precipitated in the fourth mixing tank. The method can further comprise recovering and drying the precipitated strontium sulfate. If flocculation is omitted from the method, then the fourth mixing tank can instead be a third mixing tank.

According to various embodiments of the present invention, a method of treating a gas well hydrofracture flowback and/or production wastewater (production wastewater) is provided that comprises first precipitating and recovering barium sulfate and subsequently precipitating and recovering strontium sulfate. The method can comprise contacting a production wastewater containing barium, with a source of sulfate ions, in a first tank and under conditions to precipitate barium sulfate. The contacting can comprise adding from about 100% to about 150% of a stoichiometrically equivalent amount of sulfate ions to the first tank, based on the amount of barium ions in the first tank. Barium sulfate can then be precipitated from the production wastewater in the first tank to form a slurry of precipitated barium sulfate and a wastewater brine. The wastewater brine comprises strontium chloride and can also comprise sodium, magnesium, and calcium chlorides. The slurry can then be pumped or otherwise moved to a second tank wherein the slurry can be mixed with a pH-adjusting reagent, for example, to increase the pH of the slurry. Sodium hydroxide can be used as the pH-adjusting reagent. Precipitated barium sulfate can then be removed from the slurry to form a separated wastewater brine. The separated wastewater brine can then be pumped or otherwise moved to a third tank. In the third tank, the separated wastewater brine can be contacted with a source of sulfate ions under conditions to precipitate strontium sulfate. Strontium sulfate can then be precipitated from the separated wastewater brine in the third tank, and recovered. The method can further comprise removing precipitated strontium sulfate from the separated wastewater brine to form a refined wastewater brine, and evaporating the refined wastewater brine to form water and evaporation products. The evaporation products can comprise, for example, crystalline sodium chloride. In some embodiments, the pH of the refined wastewater brine can be adjusted to be between 6.5 and 7.5, before the evaporating.

The method can optionally further comprise flocculating the barium sulfate slurry after mixing it with the pH-adjusting reagent in the second tank and before removing the precipitated barium sulfate.

In some cases, the method can further comprise moving the refined wastewater brine to a third tank and adding from about 100% to about 150% of a stoichiometrically equivalent amount of sulfate ions to the third tank, based on the amount of strontium ions in the third tank. Strontium sulfate can then be precipitated in the third tank. As with other methods of the present invention, the method can further comprise adding an oxidizing agent, such as potassium permanganate, to the first tank while contacting the production wastewater with the source of sulfate ions.

In yet other various embodiments of the present invention, a method of treating a gas well hydrofracture flowback and/or production wastewater (production wastewater) is provided that produces a salable, liquid slurry of barite sludge. The method can comprise contacting a production wastewater comprising barium, with a source of sulfate ions, in a first tank and under conditions to precipitate barium sulfate. Barium sulfate can then be precipitated from the production wastewater in the first tank to form a slurry of precipitated barium sulfate and a wastewater brine. The wastewater brine can comprise sodium, magnesium, strontium, and calcium chlorides. The slurry can then be pumped or otherwise moved to a second tank wherein it can be mixed with a pH-adjusting reagent, for example, to increase the pH of the slurry. Sodium hydroxide can be used as the pH-adjusting reagent. The precipitated barium sulfate can then be removed or otherwise recovered from the slurry, in the form of a barite sludge. The barite sludge can then be concentrated, for example, in a thickener. The barite sludge can then be stabilized and pH-adjusted to increase the pH of the barite sludge. The stabilizing can comprise adding calcium lignin sulfonate, polyacrylate, another polymer, or a combination thereof, to the barite sludge. After the concentrating, the stabilizing, and the pH adjustment, the resulting barite sludge can be in the form of a liquid slurry, and the method can further comprise packaging the liquid slurry in a storage tank.

DETAILED DESCRIPTION

Figure 1A:
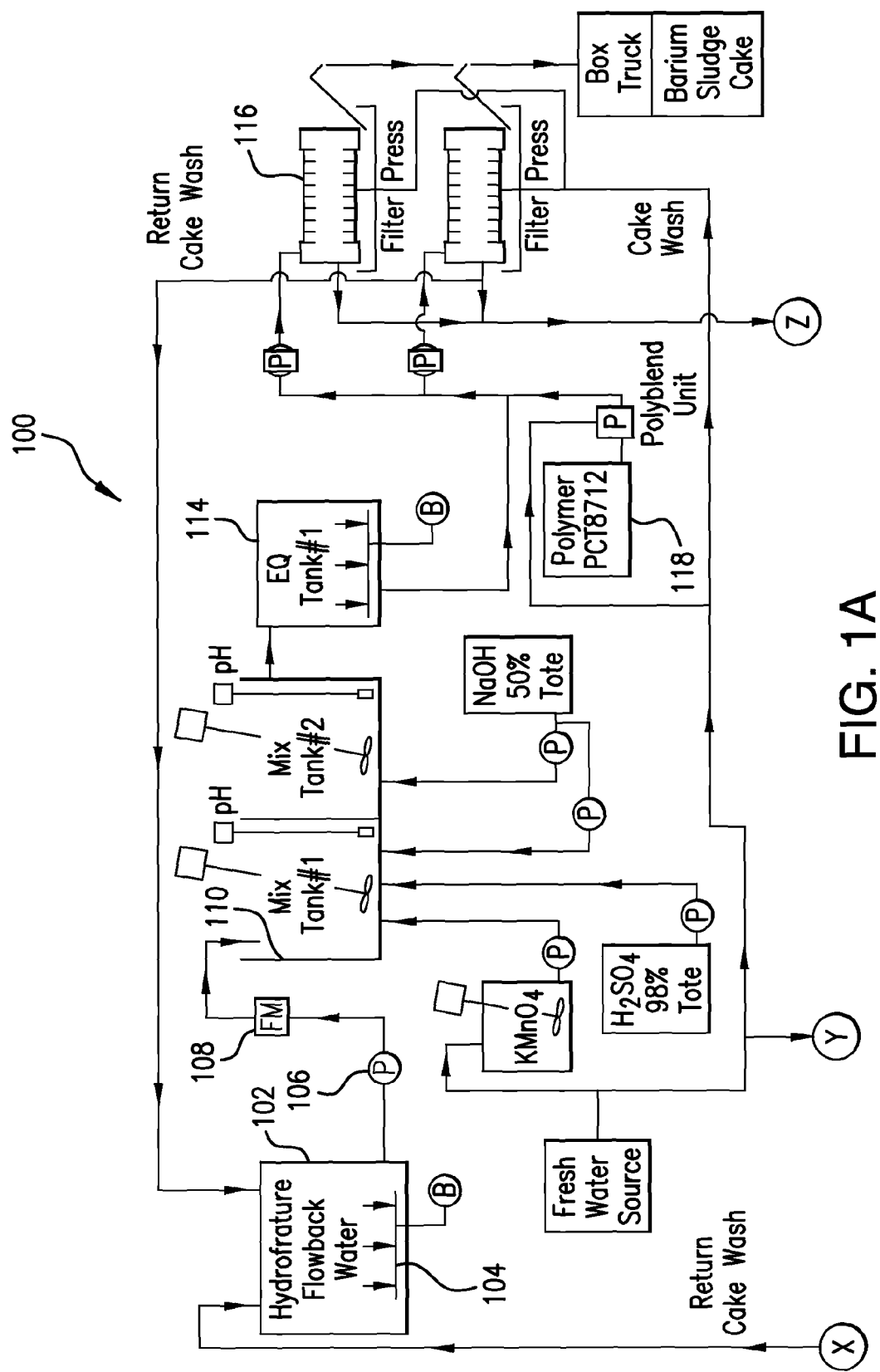
FIGS. 1A and 1B are the top and bottom, respectively, of a schematic flow diagram of an exemplary wastewater treatment system according to various embodiments of the present teachings, wherein flow line X shown in FIG. 1A is a continuation of flow line X shown in FIG. 1B, flow line Y shown in FIG. 1A is a continuation of flow line Y shown in FIG. 1B, and flow line Z shown in FIG. 1A is a continuation of flow line Z shown in FIG. 1B.

According to various embodiments of the present teachings, a process for the treatment of hydrofracture wastewaters, for example, production wastewater, is provided to meet the specific parameters discussed above. The method is suitable for either direct reuse or for reuse following addition of low dissolved solids water. Furthermore, to address concerns regarding depletion of the fresh water supply in the Marcellus shale development area, the present teachings provide for the co-treatment of hydrofracture flowback and production wastewaters with abandoned coal mine acid drainage (AMD). Such co-treatment puts to good use a polluted water source and provides a reduction of dissolved solids content in the treated water.

According to various embodiments of the present teachings, a method of treating a wastewater is provided that comprises contacting a metal-containing wastewater with a source of sulfate ions and precipitating metal compounds from the wastewater in the form of one or more metal sulfates. For example, barium can be removed as barium sulfate. The one or more metal sulfates can then be removed from the stream of wastewater to form a first treated wastewater. The first treated wastewater can then be contacted with a source of carbonate ions and the method can comprise precipitating one or more metal carbonates and/or hydroxides from the treated wastewater after contact with the source of carbonate ions. The resultant mixture can comprise a second treated wastewater and one or more metal carbonates. The mixture can then be contacted with a source of hydroxide ions and the method can comprise precipitating one or more metal hydroxides from the second treated wastewater. In some embodiments, the method can further comprise removing other metal sulfates such as strontium sulfate, and precipitated metal carbonates and/or metal hydroxides from the mixture, for example, removing calcium carbonate, strontium carbonate, strontium hydroxide, and magnesium hydroxide.

According to various embodiments of the present teachings, after metal-containing wastewater is contacted with a source of sulfate ions, the resulting wastewater can be contacted with an anionic polymer in an amount sufficient to flocculate the one or more metal sulfates. The flocculated metal sulfates can then be removed from the wastewater. In some embodiments, the metal-containing wastewater can comprise barium and the process can comprise producing one or more barium sulfates that can then be removed from the wastewater. Sufficient sulfate ions can be used to precipitate at least 90% of the barium from the metal-containing wastewater. In some embodiments, the method can further comprise contacting a mixture of treated wastewater and one or more metal carbonates, with a source of carbonate ions.

According to various embodiments, the method can comprise filtering metal sulfates, metal carbonates, and metal hydroxides out of a wastewater, for example, by using a filter press. After metal compounds are removed from the wastewater, the wastewater can be recycled, for example, by being pumped into a gas well hydrofracture. The metals that can be removed, according to various embodiments of the present teachings, include barium sulfate, strontium sulfate, calcium carbonate, strontium carbonate, magnesium hydroxide, and strontium hydroxide. The metals can be removed in the form of metal sludge cakes formed by a filter press, slurry, or the like.

According to various embodiments of the present teachings, the method can use, as a source of sulfate ions, a discharge stream from a coal mine or water from an abandoned coal mine. In some embodiments, a method is provided whereby a liquid comprising abandoned coal mine water and gas well hydrofracture wastewater is disposed in a gas well hydrofracture.

Accordingly to various embodiments, a method of treating a hydrofracture wastewater is provided comprising the following processes. A hydrofracture wastewater can be contacted with a source of sulfate ions to form one or more metal sulfates. The one or more metal sulfates can be precipitated from the hydrofracture wastewater. The one or more precipitated metal sulfates can be removed from the hydrofracture wastewater to form a wastewater brine that is substantially free of precipitated metal sulfate. The wastewater brine can comprise sodium chloride and calcium chloride. The wastewater brine can be evaporated in an evaporator to form water and an evaporation product. The evaporation product can comprise crystalline sodium chloride and a liquor comprising from about 25% by weight to about 60% by weight calcium chloride based on the total weight of the liquor. The evaporation product can be filtered to form a retentate comprising crystalline sodium chloride, and a filtrate comprising the liquor. The retentate can be washed with saturated sodium chloride brine. The washed retentate can be dried. In some embodiments, bromine and/or lithium can are recovered from the liquor. Various metal sulfates, such as barium sulfate, can be removed from the wastewater during the production of the wastewater brine. The source of wastewater to be treated can include, for example, gas well production wastewater from a hydrofracturing process. The present teachings relate to a process, system, equipment, and chemical reactions for treatment, and co-treatment with AMD, of gas well wastewaters from completion, hydrofracture, and production. According to various embodiments, the majority of gas well wastewater to be treated is production wastewater. This wastewater is produced during gas production after the gas production well is hydrofractured. The hydrofracture process occurs when water is mixed with fine sand and various additives to reduce its viscosity and injected into underground gas producing formations to crack them. Hydrofracture water is removed from the formation following the fracture process to permit gas production and recovery.

Hydrofracture or cracking of the gas bearing formation is employed to allow gas to escape to the drilled well. The sand remains in the formation to keep the cracks produced by the high pressure water open after the pressure is released and the flowback water removed. The removed water, often 1.0 million to 3.0 million gallons per well, is the hydrofracture flowback wastewater, which can be either treated and reused, or sent to disposal. Production water is co-produced with gas when the well is in operation, with amounts generated that vary from 10 gallons per day (gpd) to 4,000 gpd for the life of the well. Production water is generally saturated as to its ability to dissolve additional material and thus varies less than hydrofracture flowback water with regard to dissolved solids content. While both hydrofracture flowback and production water show variation in chemical composition, the methods of the present teachings can treat them both and the term production wastewater can include hydrofracture flowback water and/or production wastewaters.

Figure 1B:
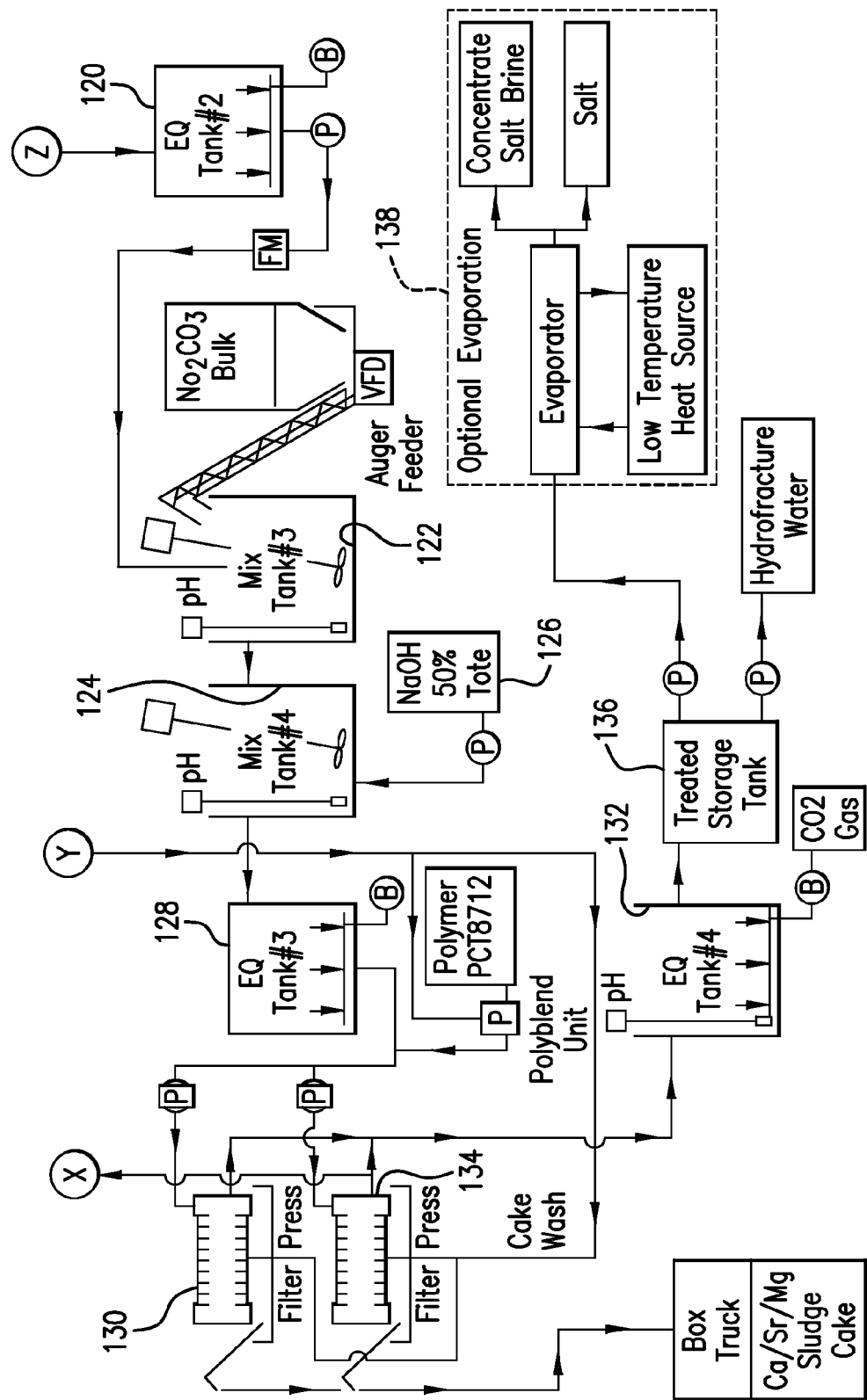

With reference to FIGS. 1A and 1B, according to various embodiments of the present teachings, gas well hydrofracture wastewater can be delivered for treatment to a fixed or mobile treatment process unit 100. Delivery can be by tank truck, railcar, directly from a gas well, or pumping from a wastewater containment area, for example, near a gas production well. The wastewater can be accumulated in an equalization tank 102 that is of sufficient volume to retain a volume equal to at least 8 hours of operation at the designed wastewater throughput of the treatment process. This tank can be equipped with an aeration system 104 to maintain aerobic conditions in the contained wastewater at all times.

The wastewater can be transferred from equalization tank 102 at a fixed flow rate by a pump 106, flow measurement device 108, and/or flow control device, to a first process tank 110. Positive displacement pumps such as a progressive cavity pump equipped with a variable frequency drive can be used. Exemplary flow rates are from 5 to 2000 gallons per minute (gpm), for example, from 10 to 1500, from 100 to 1000, or from 20 to 500 gpm. Abandoned coal mine drainage (AMD) can be added to the fixed flow of wastewater at ratios of from 1:1 to 1:10, or from 1:3 to 1:4, for co-treatment. Use of AMD can reduce or eliminate the amount of sulfate ion to be added to the first process tank for barium sulfate precipitation. First process tank 110 can provide, for example, 5 minutes of retention time at the determined fixed flow rate and can have a high rate of mixing, for example, defined as a power input of at least 10 horsepower (hp) per 1000 gallons capacity. The mixer can be a high speed mixer, for example, having an rpm of greater than 400 rpm.

Furthermore, first process tank 110 can be designed to dimensions such that it can have a "square" cross-section when viewed.

Chemicals that can be added to first process tank 110 can include potassium permanganate, sulfuric acid, and sodium hydroxide. Chemical additions can be in amounts sufficient to maintain the wastewater in an oxidized condition and within the pH range of from 3.0 to 3.5. Sufficient sulfate ion can be added to precipitate at least 50%, at least 75%, at least 90%, at least 95%, or all of the barium in the wastewater, as barium sulfate. Wastewater from first process tank 110 can be made to flow by gravity to a first process equation tank 114 and provide approximately 50 minutes retention time at a desired flow rate.

From first process equalization tank 114, the pH-adjusted wastewater can be pumped to a first chalked and gasketed plate and frame filter press 116 at flow rates from twice to less than 10% of the design flow rate. In the pump line from tank 114 to filter press 116, a diluted, for example, to 0.2% to 0.5% by weight, anionic polymer such as PCT 8712 available from ProChemTech International, Inc., Brockway, Pa., can be added from a supply tank 118 to flocculate the precipitates produced in the previous two process steps. Filter press 116 can remove the precipitates, including barium sulfate and other materials, for example, iron and manganese. Removal can be in the form of a solid sludge cake comprising from 25% to 65% solids, for example, 40% solids. The clear liquid filtrate can be discharged from filter press 116 into a second process equalization tank 120 to provide approximately 60 minutes of retention time.

The filtrate in second process equalization tank 120 can be pumped to a third mix tank 122 to provide a retention time of 5 minutes at a desired flow rate. Sodium carbonate can be automatically added to third mix tank 122 as a dry powder to raise the pH of the wastewater to within a range of from 9.5 to 10.5. Under these reaction conditions, calcium precipitates as calcium carbonate and a substantial portion of any strontium present precipitates as strontium carbonate. The treated wastewater can then be pH-adjusted in a fourth mix tank 124, for example, by adding sodium hydroxide from a source tank 126. The pH-adjusted wastewater can then be made to flow by gravity into an aerated third equalization tank 128 to provide approximately 60 minutes of retention time.

From third process equalization tank 128, the pH-adjusted wastewater can be pumped to a second chalked and gasketed plate and frame filter press 130 at a flow rate of from twice to less than 10% of the desired flow rate. In the pump line from tank 128 to filter press 130, a diluted anionic polymer such as PCT 8712, for example, diluted to from 0.2% to 0.5% by weight, can be added to flocculate the precipitates produced in the previous process step. Filter press 130 can remove the precipitates, including mixed calcium and strontium carbonate, as a solid sludge cake comprising from 25% to 65% solids, for example, about 40% solids. Clear liquid discharged from filter press 130 can be directed into an aerated fourth process equalization tank 132 to provide approximately 60 minutes of retention time.

The clear, filtered wastewater from fourth process equalization tank 132 can be pumped to fourth mix tank 124 to provide a retention time of 5 minutes at the desired flow rate of the system. Sodium hydroxide solution, for example, at 50% by weight, can be automatically added to fourth mix tank 124 to raise the pH of the wastewater to within a range of from 11.5 to 13.5. Under these reaction conditions, magnesium can be precipitated as magnesium hydroxide and any remaining strontium can be precipitated as strontium hydroxide. The pH-adjusted wastewater can then be made to flow by gravity into aerated fourth equalization tank 132, or into a fifth equalization tank (not shown), to provide approximately 60 minutes of retention time.

From third process equalization tank 128 or an optional fifth process tank (not shown), the pH-adjusted wastewater can be pumped to filter press 130 or to a third chalked and gasketed plate and frame filter press 134, for example, at a flow rate of from twice to less than 10% of the desired flow rate. In the pump line from the third or fifth process equalization tank to the filter press 130 or 134, a diluted anionic polymer such as PCT 8712, for example, to 0.2% to 0.5% by weight, can be added to flocculate the precipitates produced in the previous process step. Filter press 134 can remove the precipitates, including mixed magnesium and strontium hydroxides, as a solid sludge cake comprising from 25% to 65% solids, for example, 40% solids. Clear liquid discharged from the filter press can be directed into fourth equalization tank 132 to provide approximately 10 minutes of retention time.

In fourth equalization tank 132, carbon dioxide gas can be automatically added, for example, via diffusers, to the clear, treated wastewater to reduce the pH to within the range of from 6.5 to 8.5, for example, a pH within the range of from 6.5 to 7.5. The pH-adjusted, clarified wastewater can then be discharged by gravity into a clear water storage tank 136 for use or to be stored until subject to evaporation. If used, the pH-adjusted clarified wastewater can be used as a hydrofracture makedown water.

According to various embodiments, if the co-treatment of AMD is used and/or the hydrofracture wastewater has low levels of barium, calcium, magnesium, and strontium, the process filter presses can be replaced by inclined plate clarifiers. In some embodiments, inclined plate clarifiers can be used if the suspended solids level of the treated wastewaters exiting the first, second, or third process equalization tanks is less than 0.5% by weight. In such cases, the process equalization tanks can be eliminated from the process as process clarifiers would flow by gravity. A sludge holding tank can be provided for each process clarifier to retain the sludge removed on an automatic basis, for example, using positive displacement pumps. In some embodiments, three separate dewatering filter presses can be provided, one for each sludge stream. The dewatering filter presses can be fed by positive displacement pumps from the sludge holding tanks. Filtered waters can be returned, for example, to the system equalization tank and/or used as recycle hydrofracture water. Evaporation can be accomplished by utilizing one or more evaporation units 138 as shown and described in U.S. patent application Ser. No. 12/620,019, which is incorporated herein in its entirety by reference.

Figure 2A:
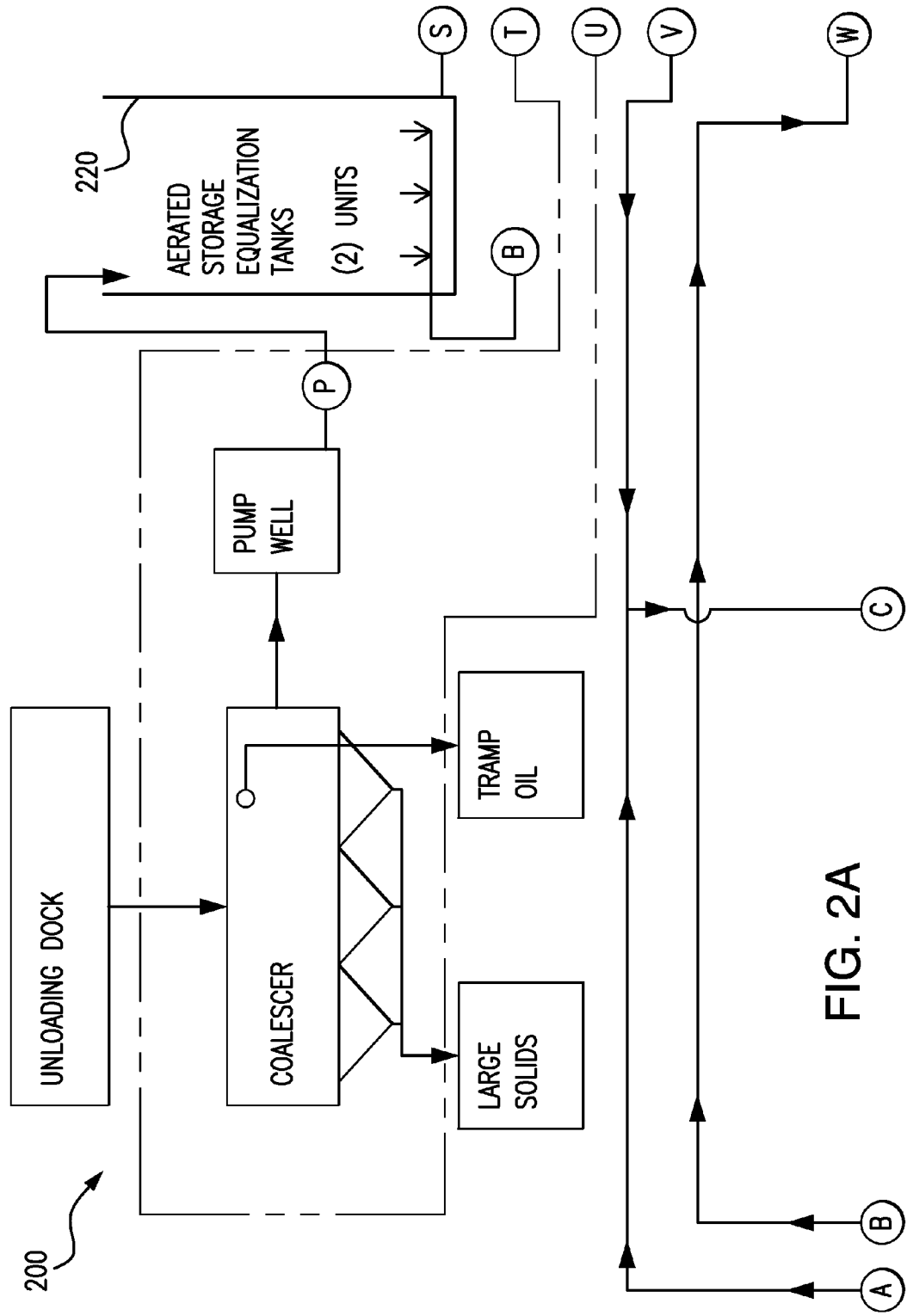
FIGS. 2A-2D constitute a schematic flow diagram of an exemplary wastewater treatment system according to various embodiments of the present teachings, wherein flow lines A-C shown in FIG. 2C are continuations of flow lines A-C, respectively, shown in FIG. 2A, flow lines S-W shown in FIG. 2B are continuations of flow lines S-W, respectively, shown in FIG. 2A, flow lines D-J shown in FIG. 2D are continuations of flow lines D-J, respectively, shown in FIG. 2B, and flow lines X-Z shown in FIG. 2D are continuations of flow lines X-Z, respectively, shown in FIG. 2C.
Figure 2B:
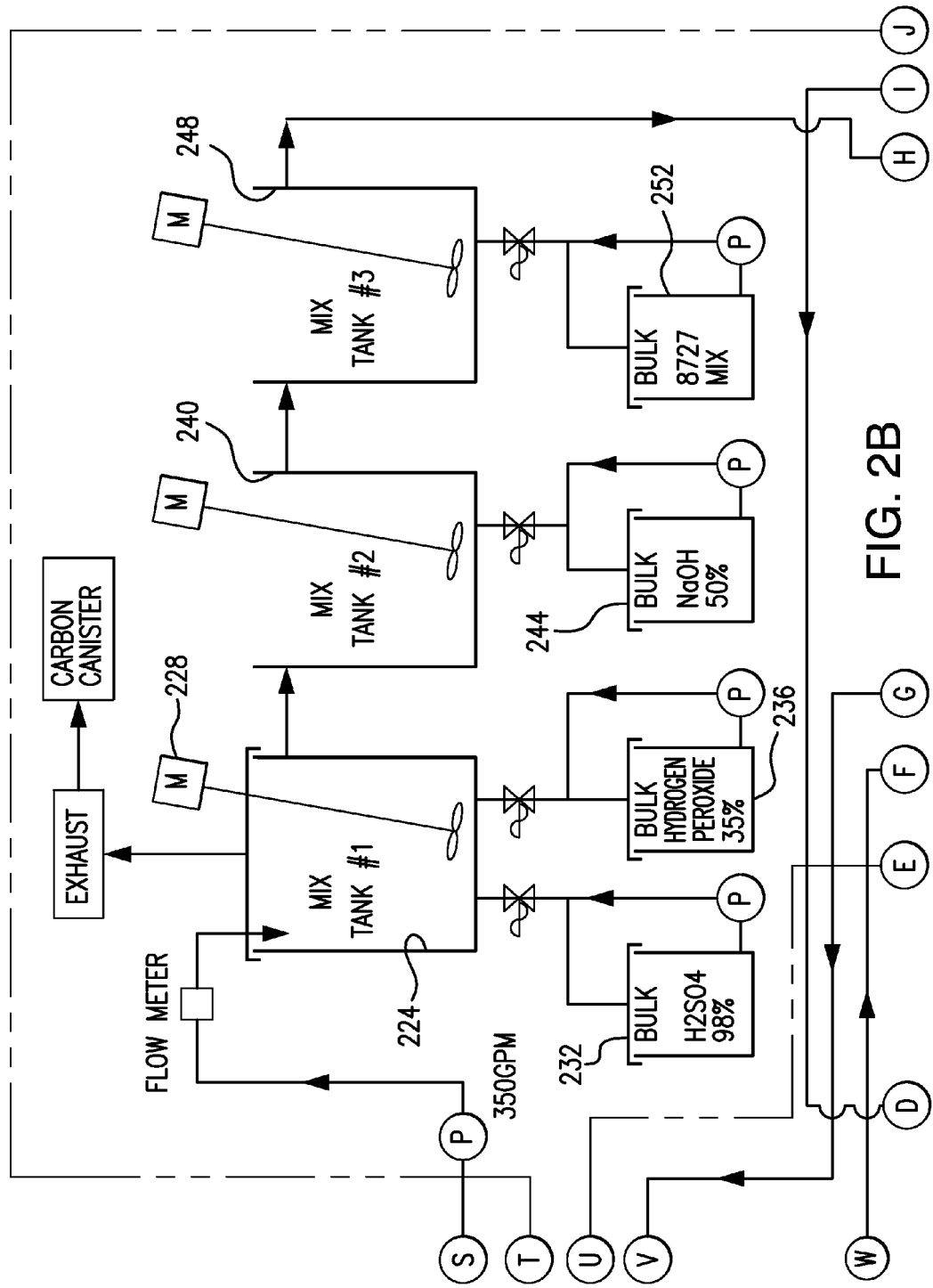
Figure 2C:
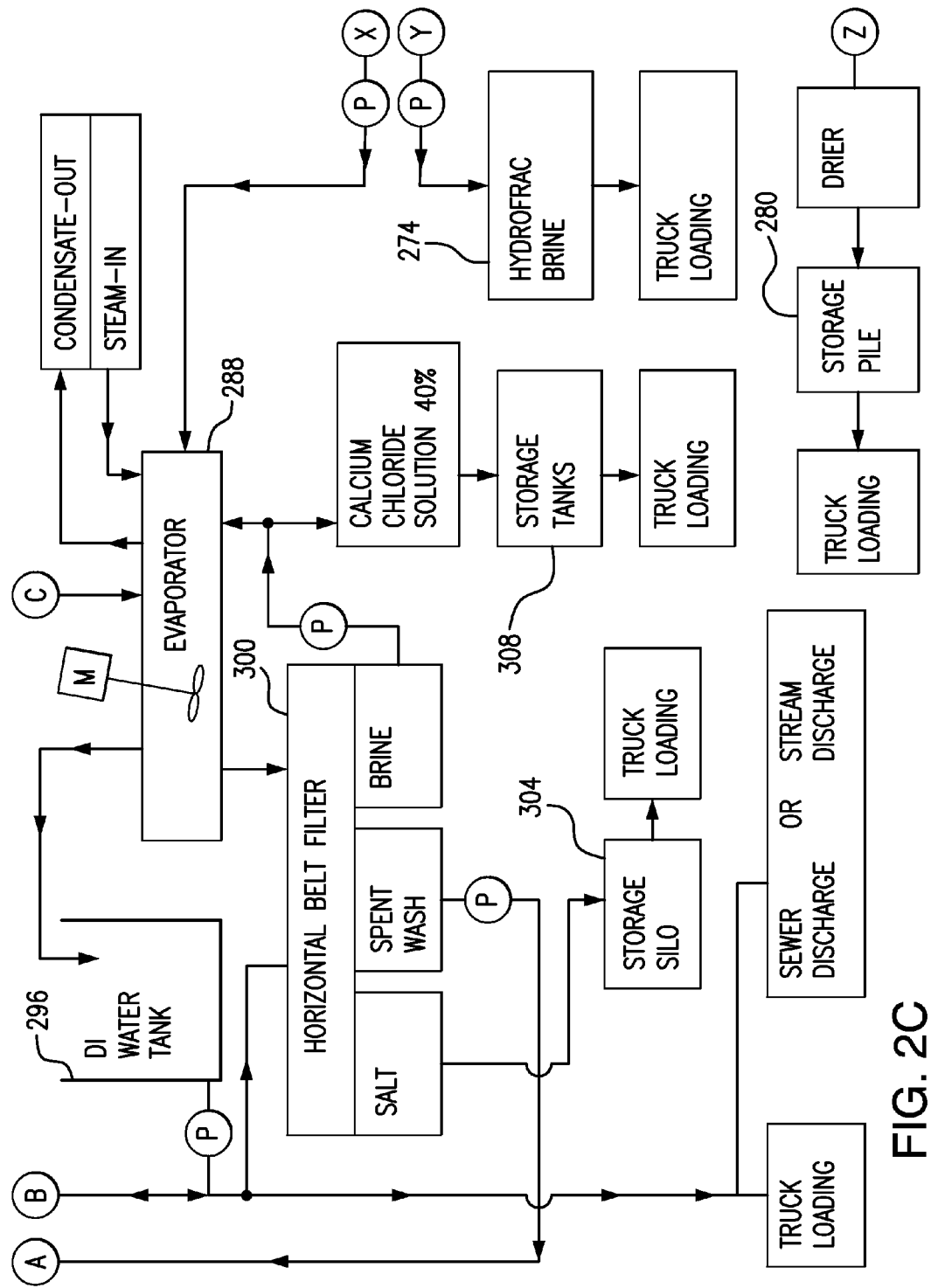
Figure 2D:
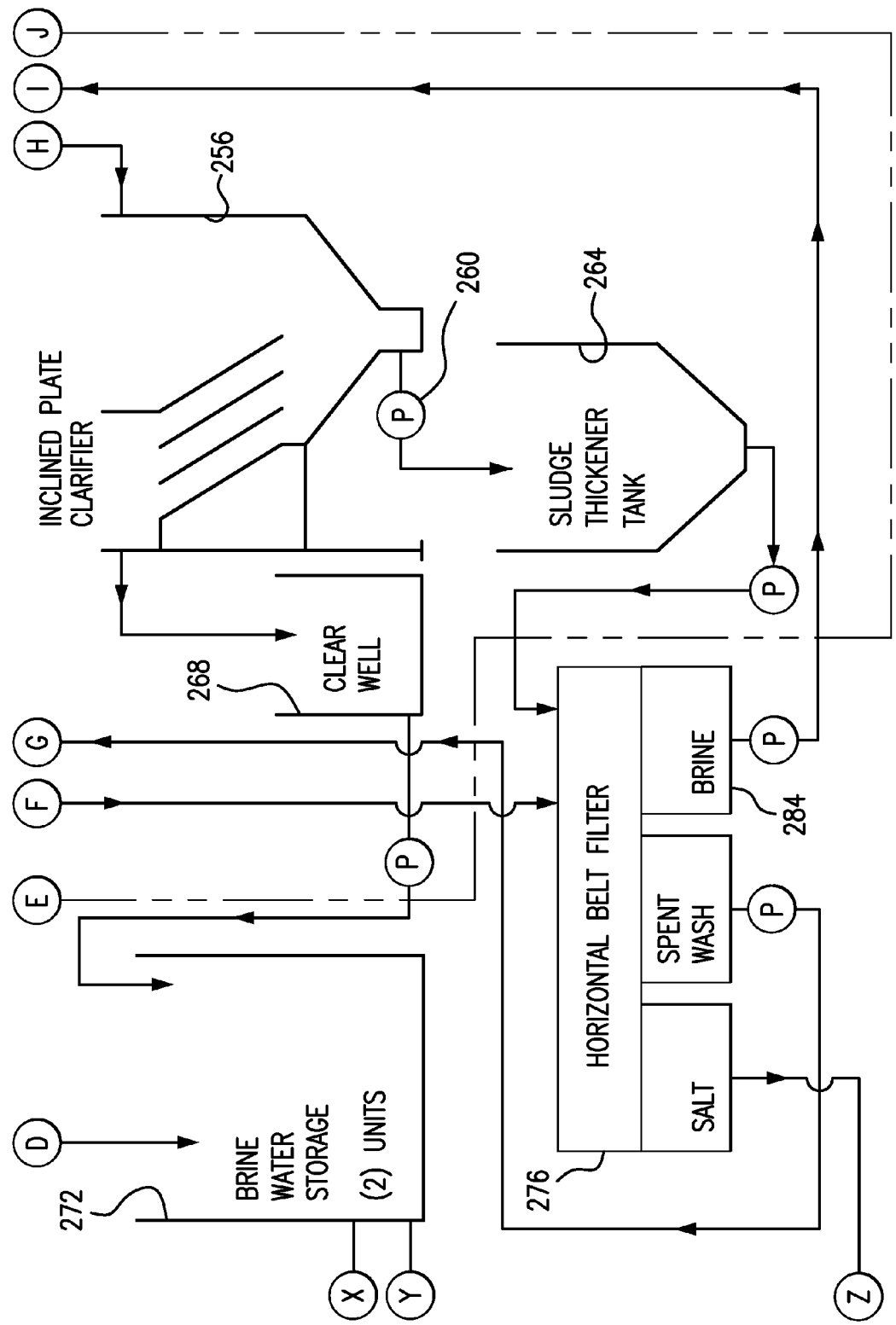

In yet another embodiment of the present teachings, a method of treating a production wastewater is provided that can comprise the following process, as described with reference to FIGS. 2A-2D. FIGS. 2A-2D constitute a schematic flow diagram of an exemplary wastewater treatment system according to various embodiments of the present teachings, wherein flow lines A-C shown in FIG. 2C are continuations of flow lines A-C, respectively, shown in FIG. 2A, flow lines S-W shown in FIG. 2B are continuations of flow lines S-W, respectively, shown in FIG. 2A, flow lines D-J shown in FIG. 2D are continuations of flow lines D-J, respectively, shown in FIG. 2B, and flow lines X-Z shown in FIG. 2D are continuations of flow lines X-Z, respectively, shown in FIG. 2C.

In the embodiment shown in FIGS. 2A-2D a production wastewater can be contacted with a source of sulfate ions to form one or more metal sulfates. The one or more metal sulfates can be precipitated from the production wastewater. The one or more precipitated metal sulfates can be removed from the production wastewater to form wastewater brine that is substantially free of precipitated metal sulfate. The wastewater brine can comprise sodium chloride, magnesium chloride, strontium chloride, and calcium chloride.

The present teachings provide a system and method to carry out chemical reactions under various conditions for the treatment of gas well production wastewater and hydrofracture wastewater. The reactions are tailored for resource recovery so as to eliminate problems otherwise presented by disposal of such wastewaters and solid wastes generated by treatment processes required prior to disposal. FIGS. 2A-2D show a concept flow diagram providing a simplified process flow schematic 200. Quantities and other values for the various parameters indicated in schematic 200 are exemplary and non-limiting.

According to various embodiments, the process can begin with coalescer separation of large solids and tramp oil from the production wastewater. The production wastewater is then equalized and aerated in storage tanks to obtain an aerobic, uniform stream for continuous treatment at flows from about 0.1 gallon per minute (gpm) to about 10,000 gpm, for example, from about 1.0 gpm to about 1,000 gpm, from about 5.0 gpm to about 500 gpm, or of more than about 10,000 gpm. The process can be operated as a fixed site installation and/or can be trailer mounted for mobile use. Gas well production wastewater and/or hydrofracture wastewater can be delivered for treatment at a fixed or mobile treatment process unit by tank truck, railcar, directly from a gas well, or pumped from a wastewater containment area near the gas production well. Wastewater can be accumulated in "equalization tanks", which can have a volume sufficient to retain a volume equal to an amount generated after at least 24 hours of operation or after another suitable time based on the design wastewater throughput of the treatment process. The production wastewater can be accumulated in such an equalization tank prior to contact with a source of sulfate ions.

Any suitable tank can be equipped with an aeration system to maintain aerobic conditions in the contained wastewater at all times, or temporarily. In some systems, two equal volume tanks can be provided to permit continuous operation of the treatment process. This approach provides for chemical equalization of the wastewater and can reduce operational analysis to just once every 24 hours or at some other desired frequency. The treatment process can draw from a full or partially full tank while one or more other tanks is filling. The tanks can rotate once a day, or at some other desired frequency, or as a function of an on-line status. Equalized wastewater in the full tank can be analyzed for barium, strontium, and/or other metal ion content prior to being pumped at a constant design flow rate from the aerated equalization tank to the first process tank. Barium, strontium, and/or other metal ion content can determine the amount of sulfate ion added in the first process tank.

As shown in FIGS. 2A-2D, the hydrofracture wastewater can be transferred to a first process (mixing) tank 224 after being aerated. Wastewater can be transferred from the equalization tank to the first process tank at a fixed flow rate by using a pump, a flow measurement device, and a flow control device. Such methods and means can also be used for transfer between other tanks described herein. Both positive displacement pumps, such as a progressive cavity pump, and centrifugal pumps equipped with a variable frequency drive can be employed. Typical flow rates can be from about 0.1 gpm to about 10,000 gpm, from about 1.0 gpm to about 5,000 gpm, from about 5.0 gpm to about 2,000 gpm, or at more than about 10,000 gpm. The production wastewater can be mixed in the first process tank with a mixer 228 spinning at a rate of from about 100 rpm to about 1,000 rpm, from about 250 rpm to about 750 rpm, from about 400 rpm to about 600 rpm, or at a rate of greater than 1,000 rpm. First process tank 224 can provide a detention time of from about 10 seconds to about 10 hours, from about 30 seconds to about 5.0 hours, from about 1.0 minute to about 2.5 hours, from about 5.0 minutes to about 1.0 hour, or from about 15 minutes to about 45 minutes, at a fixed, or variable flow rate. First process tank 224 can be mixed at a high rate of mixing defined as a power input of 10 horsepower (hp) per 1000 gallons capacity, or greater. Furthermore, first process tank 224 can be designed with dimensions such that the tank is "square" when viewed. Other tank geometries can also be employed.

Controlled additions of an oxidant, pH adjusters, and precipitants can be made to the wastewater in first process tank 224. Chemical additions to first process tank 224 can include, for example, potassium permanganate, hydrogen peroxide, and/or sulfuric acid. A sulfuric acid supply 232 and a hydrogen peroxide supply 236 can be provided in fluid communication with first process tank 224, as can a potassium permanganate supply (not shown). A potassium permanganate solution, for example, 5% by weight solution based on the total weight of the solution, or a 34% by weight hydrogen peroxide solution based on the total weight of the solution, can be added as an oxidizer to destroy all readily oxidizable constituents. Sulfate ion supplied, for example, as a 98% by weight sulfuric acid solution, can be added to first process tank 224 in proportion to the amount of barium, strontium, or other metal ions in the wastewater. The pH of the hydrofracture wastewater can be adjusted to be less than about 1.0. Chemical additions can be sufficient to maintain the wastewater in an oxidized condition and at a pH of below 1.0, or at some other desired pH.

To recover salable commodities from the production wastewater while generating little or no hazardous residues or non-compliant water discharges, the production wastewater can be first treated for removal of barium and other toxic and/or trace radioactive metals. The hydrofracture wastewater can then be contacted with the source of sulfate ions to form one or more metal sulfates. Sufficient sulfate ion can be added to precipitate the desired amounts of barium, strontium, and/or other metal compounds from the wastewater as barium sulfate, strontium sulfate, and/or as other metal sulfates. Depending upon the desired barium and/or other metal compound removal, the amount of sulfate ion added in first process tank 224 can be adjusted from substoichiometric amounts up amounts that are 80% over a stoichiometric equivalent amount. The stoichiometry or excess stoichiometry can be calculated based on the combined amount of barium, strontium, and/or other metals present in the wastewater. For complete removal of barium and strontium, sulfate ion can be added in an amount of 50% over, 60% over, 70% over, or 80% over the stoichiometric amount of the metals, to form barium and strontium sulfate. For the removal of less barium, proportionally less sulfate ion can be used. With the addition of sulfate ion to the wastewater under oxidizing conditions, the barium preferentially precipitates.

After the contact with the source of the sulfate ions, the production wastewater can be transferred from first process tank 224 to a second process tank 240. Wastewater from first process tank 224 can flow by gravity, or be otherwise transferred, to second process tank 240. The pH of the production wastewater in second process tank 240 can be adjusted to be within a range of from about 3.0 to about 7.0, for example, from about 3.0 to about 5.5 or from about 3.0 to about 4.0. A sodium hydroxide supply or other alkaline supply 244 can be provided in fluid communication with second process tank 240. Sodium hydroxide solution of suitable concentration can be added to this mix tank to obtain and maintain a pH level between 3.0 and 4.0. In a second process step, the production wastewater can be strongly mixed in second process tank 240 for a detention time of 5.0 minutes at the design flow rate of the system. Other desired mixing and detention times can be used such as those described for the accumulation tank or for first process tank 224. Strontium, lead, radium, uranium, and/or other metal ions can precipitate as sulfate with the higher pH maintained in the second process step. Higher pH conditions, however, can cause the undesirable precipitation of calcium sulfate.

In some embodiments, sodium hydroxide solution or another suitable alkaline solution, for example, containing about 50% by weight alkaline component based on the total weight of the solution, can be added to raise the pH of the wastewater to be between about 3.0 and 4.0. The pH-adjusted wastewater can then be transferred into a third process tank 248, for example, by gravity flow. An anionic polymer can be added to the hydrofracture wastewater in third process tank 248 to flocculate solids. Wastewater can be mixed and/or retained in third process tank 248 for a 10-minute detention time, or for a detention time as described for the accumulation tank, for first process tank 224, or for second process tank 240, for example, at a determined fixed flow rate. Mixing in third process tank 248 can occur a high rate of mixing defined as a power input of 10 hp per 1000 gallons capacity or more. The mixer can be of a type described as low speed, for example, operating at less than about 400 rpm. For example, third process tank 248 can be equipped with a slow speed, VFD drive mixer. Mixers of greater speed can be alternatively employed. Furthermore, third process tank 248 can be designed to dimensions such that it is "square" when viewed, or it can have another desired geometry.

The anionic polymer can comprise any suitable anionic polymer, for example, PCT 8727, available from ProChemTech International, Inc., Brockway, Pa. The anionic polymer can be pre-diluted. The anionic polymer can be added to third process tank 248 to flocculate the precipitated particles resulting from the previous two process steps. For example, a solution of PCT 8727 can be added to third process tank 248 from an anionic polymer supply 252 to obtain a concentration of from 2.9 to 10.0 mg/l as active product in third process tank 248. PCT 8727 can be supplied, for example, as a 0.2% by weight to 0.5% by weight aqueous solution based on the total weight of the aqueous solution.

The wastewater can be discharged from third process tank 248 into an inclined plate clarifier 256, or analogous device, by flowing by gravity, or other means, preferably with little or no head loss. The precipitated and flocculated solids can then be removed as a sludge from the bottom of the clarifier by a positive displacement pump 260 and transferred to a sludge thickening tank 264. Sludge can be pumped to an appropriate dewatering and washing device such as a horizontal belt press, a filter press, or a rotary vacuum drum filter. The sludge can be first dewatered with filtrate that is then returned to the brine storage tank, and then the sludge can be washed with water that has low dissolved solids, for example, less than 500 mg/l solids. Spent wash water can be returned to an off-line equalization tank, evaporator, or wastewater brine storage tank. The dewatered sludge can then be washed to form a washed sludge. The dewatered and washed sludge can then be dried and placed into a storage pile 280 as a commodity consisting mainly of barium sulfate or barite.

As described above, the production wastewater can be clarified to form wastewater brine and sludge. The sludge can comprise the precipitated metal sulfates and flocculated solids. The wastewater brine can comprise a sodium chloride brine 284 from washing the sludge. The used brine can be collected and the collected brine can be introduced into an evaporator 288. Sludge cake produced is non-hazardous and is suitable, with optional further processing, for use as a drilling mud additive, for use as a component of glass batch, or for other uses well known for "barite."

The clarified wastewater, which is now a brine, can be discharged by gravity into a clear well 268 and can be pumped to a brine storage tank 272. Brine produced by the foregoing process is acceptable for use as hydrofracture makeup water and can be collected for use, for example, from brine storage tank 272. The wastewater brine can have a pH of about 1.0 to about 14.0, from about 1.5 to about 12.0, from about 2.0 to about 8.0, or from about 3.0 to about 4.0. The brine can be sold as a commodity, for example, as hydrofracture makeup water, and can be supplied from brine storage tank 272, or from a hydrofrac brine reservoir 274.

According to various embodiments of the present teachings, when production wastewater from which barium and other toxic metals have been removed, is concentrated by evaporation, the sodium chloride therein can fractionally crystallize from the solution, leaving a liquor that includes mainly calcium chloride in solution. Typically, concentrating the brine to a calcium level of 180,000 mg/l will cause an initial sodium level of 80,000 mg/l to decrease to a level of less than 2,000 mg/l. The calcium concentration factor with typical production wastewater is approximately 10 times its original concentration, but any desired concentration can be employed, for example from about 1 time to about 100 times, from about 2 times to about 75 times, from about 3 times to about 60 times, from about 5 times to about 25 times, or greater than about 100 times the original concentration. The wastewater brine can be evaporated in evaporator 288 to form water and an evaporation product. The evaporation product can comprise crystalline sodium chloride and a liquor comprising from about 25% by weight to about 60% by weight calcium chloride based on the total weight of the liquor. Brine can be pumped to an appropriate evaporator and concentrated by evaporation to reach a calcium chloride concentration in the concentrate or liquor, of from about 10% by weight to about 80% by weight based on the total weight of the solution, for example, from about 25% by weight to about 60% by weight, or from about 40% to about 50% by weight. The amount of concentration can be governed by the amount of residual sodium desired in the liquor following dewatering to remove crystallized sodium chloride. Concentration to higher levels of calcium chloride result in lower levels of sodium chloride in the final calcium chloride solution.

According to various embodiments of the present teachings brine produced by that first precipitation process can be concentrated by evaporation, which results in a fractional crystallization of sodium chloride that can then be recovered as a salable commodity. Due to differing solubilities, sodium chloride fractionally crystallizes from the liquor, with low levels remaining in solution, at appropriate concentrations of calcium. In some embodiments, the appropriate level of calcium expressed as calcium chloride is in the range of from about 25% by weight to about 60% by weight based on the total weight of the solution. This level can be adjusted depending upon the desired level of sodium in the liquor filtrate. Increasing the level of calcium chloride substantially reduces the amount of sodium dissolved in the liquor. For example, at a level of 32% by weight calcium chloride, the sodium level is 24,500 mg/l, whereas at a level 53% calcium chloride, the sodium level drops to just 3,350 mg/l. These amounts are based on starting brine having a sodium level of 80,000 mg/l. The wastewater brine can be mixed in the evaporator at any desired rate using any desired mixing apparatus or method. For example, the wastewater brine can be mixed in the evaporator during the evaporating by using a mixer spinning at a rate of greater than about 400 rpm.

To produce a desirable crystalline sodium chloride, the liquor in the evaporator can be subject to high speed mixing the entire time it is within the evaporator, or for a substantial portion of the time. High speed mixing can be provided as described for the various accumulation and process tanks. The evaporator can comprise a steam-heated kettle, a multiple effect vacuum unit, a vapor recompression apparatus, or a combination thereof. If a multiple effect vacuum unit is used, it can comprise one, two, three, or more stages, and can incorporate vapor recompression and a cooling stage prior to dewatering of the liquor. The evaporator can incorporate a cooling stage to increase the amount of sodium chloride. The evaporation product can be cooled prior to the filtering, during filtering, and/or after filtering.

The system can further comprise a heat recovery device that can produce distilled water as yet another product. The water formed from the evaporating can be collected. As most evaporators utilize heat recovery from produced water vapor, which results in condensation of water, the treatment process can produce a side stream of distilled water. This distilled water can be collected in a storage tank 296 and used in process reagent preparation, used as wash water, or sold as a commodity. In the event that excess distilled water is produced, it can be discharged to a POTW or to surface waters under an appropriate permit. Water vapor from the evaporator can be passed through a condenser for energy recovery, which also results in production of distilled water. For discharge to surface waters, the distilled water must meet the PADEP effluent limitation on dissolved solids. In some cases, the distilled water can be used in such applications as boiler and cooling tower makeup water, chemical manufacture, or various process applications. In some embodiments of the process, a portion of the distilled water can be utilized within the process for makeup of the various solutions involved in barium removal and to prepare saturated sodium chloride brine for rinsing of the crystalline sodium chloride.

From the evaporator, the brine containing crystallized sodium chloride (slurry) is transferred, for example, pumped, to an appropriate dewatering and washing device 300. Filtering, dewatering, and related processes can be carried out using any suitable means or method. For example, dewatering can be performed with a device that comprises a chalked and gasketed plate, a frame filter press, a horizontal bed press, a rotary drum vacuum filter, or a combination thereof. A slurry holding tank can be provided depending upon the dewatering device selected. Liquids from the dewatering and washing steps can be returned to an off-line equalization tank. Liquor can be removed from the evaporator on a continuous basis to an appropriate dewatering and washing device such as a horizontal belt press, a filter press, or a rotary vacuum drum filter. The crystalline sodium chloride is first dewatered and then washed with saturated sodium chloride brine for removal of calcium. The evaporation product can be filtered to form a retentate comprising crystalline sodium chloride, and a filtrate comprising the liquor.

The retentate can be washed with saturated sodium chloride brine. The washed retentate can be dried. The crystalline sodium chloride can then be removed from the liquor by filtration and purified by rinsing with saturated sodium chloride brine to remove as much calcium and magnesium chloride from the product as possible. The crystalline sodium chloride can be dewatered, washed, and dried. The crystalline sodium chloride can be sold into commerce as salt for chemical production, roadway deicing, or water softening, among other uses. Saturated sodium chloride brine rinse can be used to prevent dissolution of the crystalline sodium chloride while providing good removal of calcium and magnesium chloride from the product. Spent wash water, preferentially consisting of saturated sodium chloride brine, can be returned to the evaporator. The spent saturated sodium chloride brine from rinsing of the crystalline sodium chloride can also be returned to the evaporator for recovery of both sodium chloride and calcium chloride values. Dried crystalline sodium chloride can be discharged to a storage silo 304 and sold as a commodity. Spent wash water can be returned to the evaporator.

The liquor and filtrate remaining after removal of the crystalline sodium chloride can also be a salable commodity, in the form of a calcium chloride solution. The filtrate from dewatering the crystalline sodium chloride can be tested for specific gravity by an on-line instrument, or by other means, and if within a certain specification can be pumped to a calcium chloride solution storage tank 308. Calcium chloride of a set specification can be a salable commodity. If in an acceptable range of specific density, for example, from 1.2 to 1.5, it can be transferred to storage tanks for subsequent sale into commerce as liquid calcium chloride solution for use as a dust control agent, freeze proofing of bulk minerals, or concrete additive, or used for chemical production processes among other uses. Liquor not meeting the specification can be returned to the evaporator for further removal of water.

If bromine and lithium are present in the liquor and filtrate, recovery of bromine and lithium values can also be included in the process, depending upon the economic value of the recovered materials. If the liquor and filtrate contain economically recoverable amounts of bromine and lithium, the liquor and/or filtrate can be processed for recovery of these materials as commodities. Bromine can be recovered from at least one of the liquor and the filtrate. Bromide can be recovered by electrolysis of the brine under vacuum. Bromine gas can be discharged and recovered as sodium hypobromite via an alkaline gas scrubber. Bromine recovery can comprise electrolyzing at least one of the liquor and the filtrate to form bromine gas, using a vacuum to remove the bromine gas, and scrubbing the bromine gas into a sodium hydroxide or other alkaline solution to produce a sodium hypobromite solution. Recovery of bromine from the liquor by known electrolysis methods can be incorporated independent of, or depending upon, the economics of the recovery and the commodity price of bromine.

Recovery of lithium from the liquor by known ion exchange and nanofiltration methods can be incorporated independent of or depending upon the economics of the recovery and the commodity price of lithium. Lithium can be recovered from at least one of the liquor and the filtrate.

Lithium recovery can comprise subjecting at least one of the liquor and the filtrate to selective ion exchange, to concentration by nanofiltration, or to both. Lithium recovery can comprise contacting at least one of the liquor and the filtrate with a source of carbonate ions under conditions to form lithium carbonate, and subsequently precipitating the lithium carbonate.

With reference to FIGS. 2A-2D, in an exemplary treatment for resource recovery of a Marcellus production wastewater, the process can begin by receiving production wastewater by tank truck or rail tank car delivery. As the production wastewater is unloaded, it can pass, by gravity flow, through a media coalescer for removal of tramp free oil and larger, greater than 35 microns, suspended solids. The coalescer filtered production wastewater can then be pumped into one of two 24-hour capacity aerated equalization tanks. The equalization tanks can be rotated in service so that each tank can provide for 24 hours of operation of the following treatment process so as to minimize chemical analysis of the production wastewater and subsequent treatment process set-up.

The full equalization tank can be sampled and analyzed for barium and strontium concentration for use in process set-up. Sulfate ion addition can be calculated in terms of 98% sulfuric acid at 1.7 times the stoichiometric amount needed to react with the barium and strontium amount present in the production wastewater to be treated as determined by analysis. Equalized and aerated production wastewater can be pumped from one of the provided equalization tanks at a typical rate of 500,000 gpd, through a flow meter, to mix tank #1.

In mix tank #1 five minutes of retention time can be provided with high energy mixing, and the determined amount of sulfuric acid can be metered into the mix tank via a chemical metering pump from a bulk sulfuric acid storage tank. The chemical metering pump can be set to deliver the amount of sulfuric acid determined to provide the desired amount of sulfate ion. Hydrogen peroxide, 34% by weight, can also be metered into mix tank #1 via a pump and valve delivery system from a bulk storage tank to obtain a level of 600 mg/l.

Production wastewater can then flow by gravity to mix tank #2 where five minutes of detention time can be provided with high energy mixing. An automatic pH control system can control metered addition of 50% sodium hydroxide solution via a pump and valve delivery system from a bulk storage tank to maintain a pH of between 3.5 and 4.0 in mix tank #2.

Production wastewater can then flow by gravity to mix tank #3 where ten minutes of detention time can be provided with medium energy mixing supplied via a VDF equipped mixer. An amount of made down polymer, PCT 8727 polymer, 0.2% by weight in water, can be metered into mix tank #3 via a pump and valve delivery system from a bulk makedown unit to obtain 3 mg/l polymer in the wastewater. The PCT 8727, or another flocculant, can be used to flocculate the barium precipitate formed by chemical reactions in mix tanks #1 and #2.

Flocculated wastewater can then be made to proceed by zero head loss gravity flow from mix tank #3 to an inclined plate clarifier configured to provide 0.25 gpm flow per square foot of projected plate area. For 500,000 gpd, the clarifier can have a minimum projected plate area of 1,389 sq ft. and a minimum actual plate area at 60 degrees of 2,778 sq ft.

Flocculated barium sludge can drop to the bottom of the inclined plate clarifier and be removed to a sludge thickener by a positive displacement pump configured to maintain a minimum depth of sludge in the clarifier sludge hopper.

Barium sludge can be transferred from the sludge thickener to a horizontal belt filter (HBF) where in a first vacuum stage brine wastewater is removed from the sludge. Recovered brine wastewater can then be pump transferred to the brine water storage tank.

The second stage of the HBF can provide a distilled water rinse of the sludge, which can be in the form of a solid cake of barite, to remove remaining soluble salts. The spent wash water can be is pumped to a multi-effect evaporator for recovery of both the soluble salts and the distilled water.

Barite cake can be discharged from the HBF and conveyed to a rotary dryer to reduce its moisture content to below 1%. The dried barite can then be conveyed to a roofed storage pile prior to shipment off-site.

Clarified brine wastewater can be discharged from the inclined plate clarifier into a clear well tank from which it can be pumped to a brine wastewater storage tank. Clarified brine wastewater can, at this point, be sold off-site for use as hydrofracture makeup water.

Clarified brine wastewater can be transferred by pump to a steam heated, mechanically mixed multi-effect evaporator where water can be removed by evaporation. Evaporators as described in U.S. patent application Ser. No. 12/620,019 can also or instead be used. When sufficient water has been evaporated, the sodium chloride content of the brine wastewater can precipitate from solution. A control point for the multi-effect evaporator can be to obtain a 40% by weight concentration of calcium chloride in the evaporator liquor which minimizes the sodium chloride remaining in solution to less than 3% by weight. A salt slurry, consisting of evaporator liquor and precipitated sodium chloride crystals, can be drawn from the evaporator on a continuous basis and transferred to another HBF where, in a first vacuum stage, liquor can be removed and pumped either back to the multi-effect evaporator or to a calcium chloride solution storage tank dependent upon its specific gravity. Specific gravity can be measured by an on-line instrument with a typical setting of 1.4 for discharge to the storage tank.

In the second stage of the HBF, sodium chloride brine can be utilized to wash the precipitated sodium chloride crystals to remove soluble calcium salts, magnesium salts, and strontium salts from the product. Spent wash can be pumped back to the multi-effect evaporator for recovery of salts and distilled water.

The third stage of the HFB can be utilized to dry the sodium chloride crystals via hot air passage through the product. Dry product can then be discharged from the HBF and conveyed to a storage silo prior to off-site shipment.

Water vapor can be discharged from the multi-effect evaporator and condensed into distilled water that can be stored in a distilled water storage tank. Distilled water is a commodity that can be sold or a product that can be utilized in the process for cooling tower makeup, boiler makeup, barite rinse water, and/or polymer makedown. Any excess can be discharged to an available sanitary sewer or to stream with appropriate permits.

The process can be supported by typical plant utilities in the form of a 3400 ton capacity cooling tower system providing cooling for the multi-effect evaporator and a 2000 hp boiler providing steam to the multi-effect evaporator. In some cases, a boiler can be used to supply steam for a fractional crystallizer, to heat air used to dry sodium chloride, barite, and other products in processes where the product is dried, or a combination thereof. In cases where a fluidized bed dryer is used to dry a product, such as sodium chloride, the source of heat for the fluidized bed dryer can be steam from a boiler.

The present teachings also relate to the system shown in FIGS. 2A-2D, which can be used to carry out the methods described herein. In some embodiments the system can comprise all of the components shown in FIGS. 2A-2D and in other embodiments a subsystem can be provided that comprises just the components encompassed within the dashed lines shown in FIGS. 2A-2D. In some embodiments the components not encompassed within the dashed lines can be supplied separately or can be pre-existing at a site where the method is to be carried out.

Figure 3A:
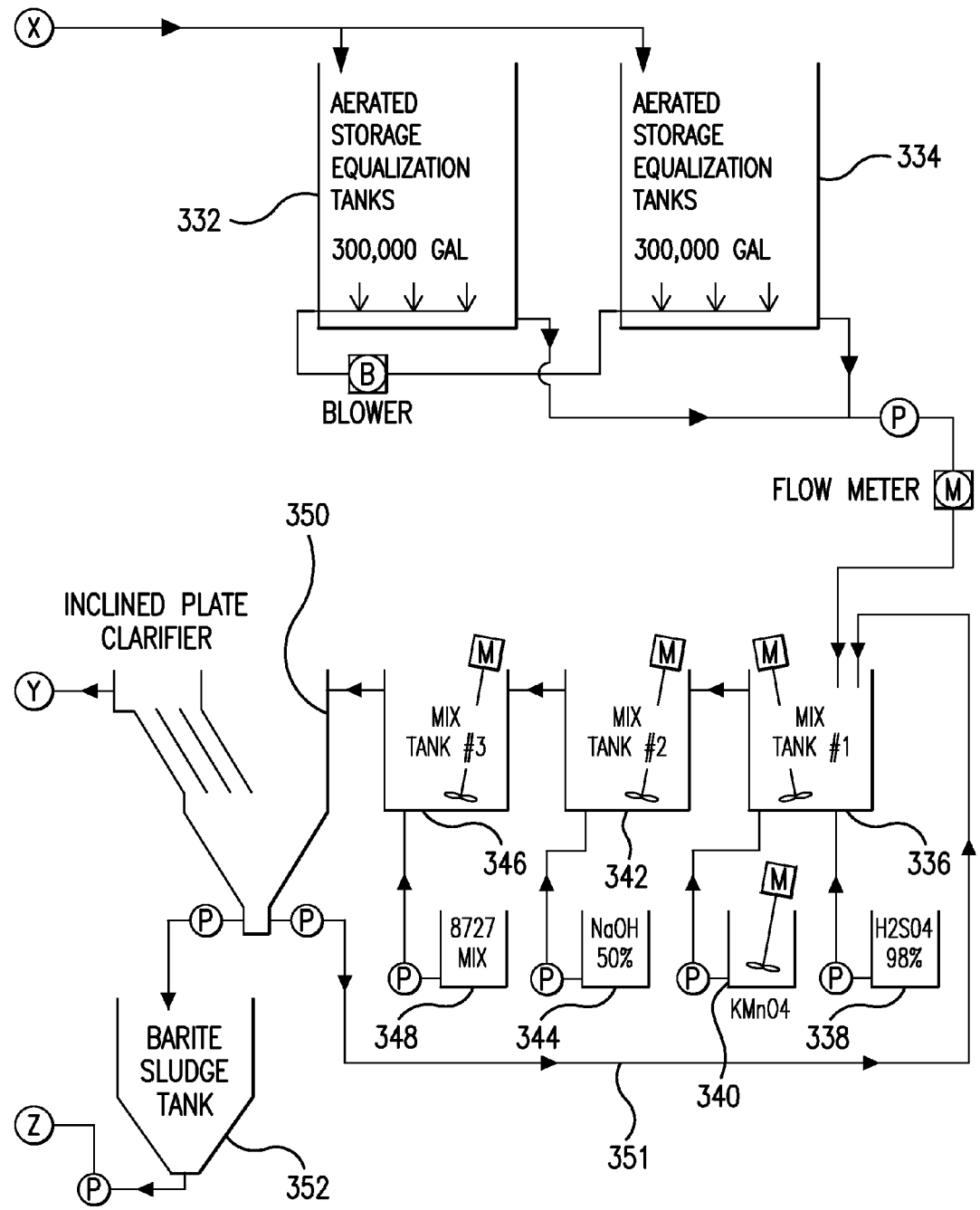
FIGS. 3A-3C constitute a schematic flow diagram of another exemplary wastewater treatment system according to various embodiments of the present teachings, wherein flow lines X and Y shown in FIG. 3B are continuations of flow lines X and Y, respectively, shown in FIG. 3A, flow line Z shown in FIG. 3C is a continuation of flow line Z shown in FIG. 3A, and flow lines A, B, C, D, and E shown in FIG. 3C are continuations of flow lines A, B, C, D, and E, respectively, shown in FIG. 3B.
Figure 3B:
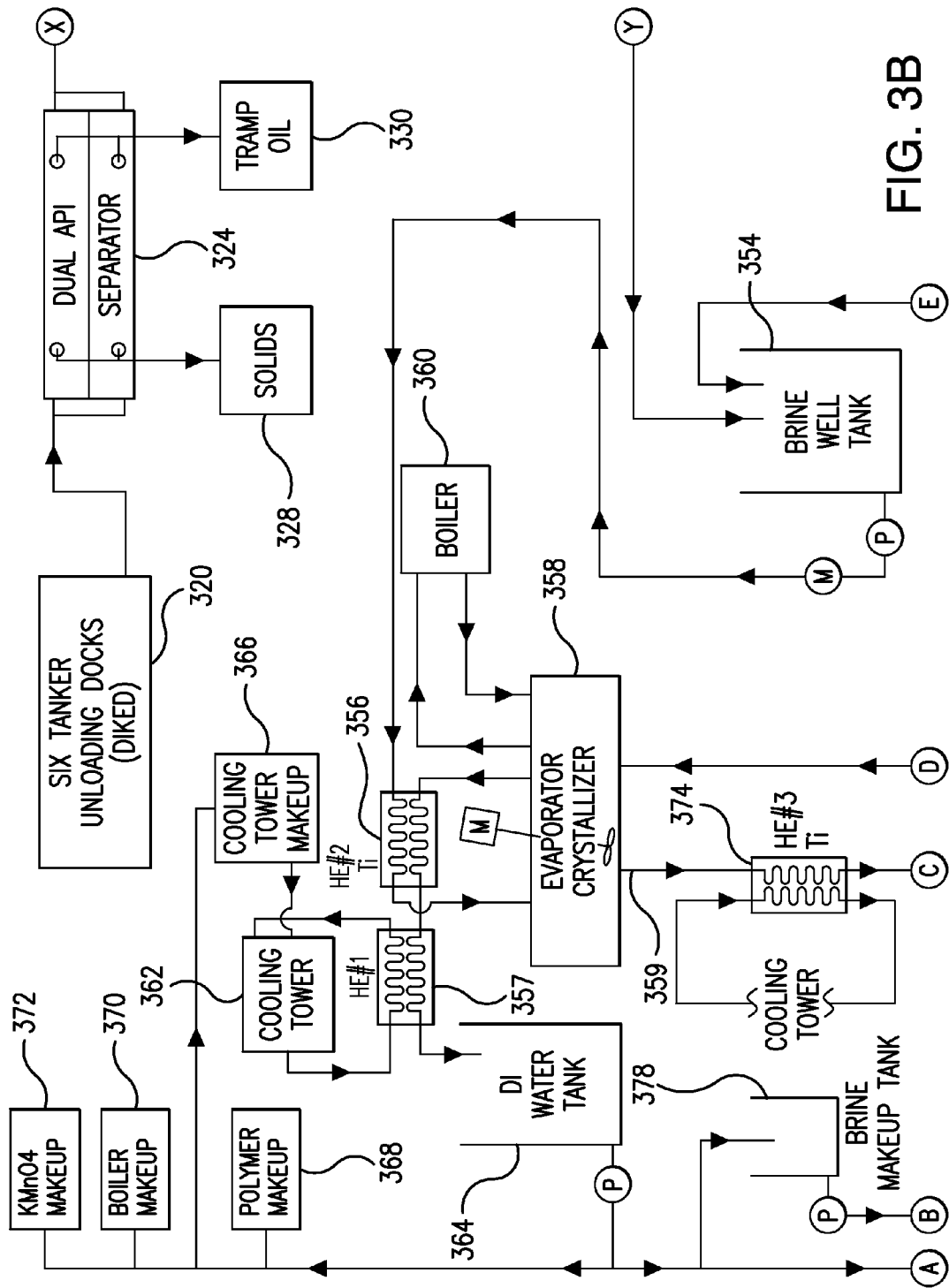
Figure 3C:
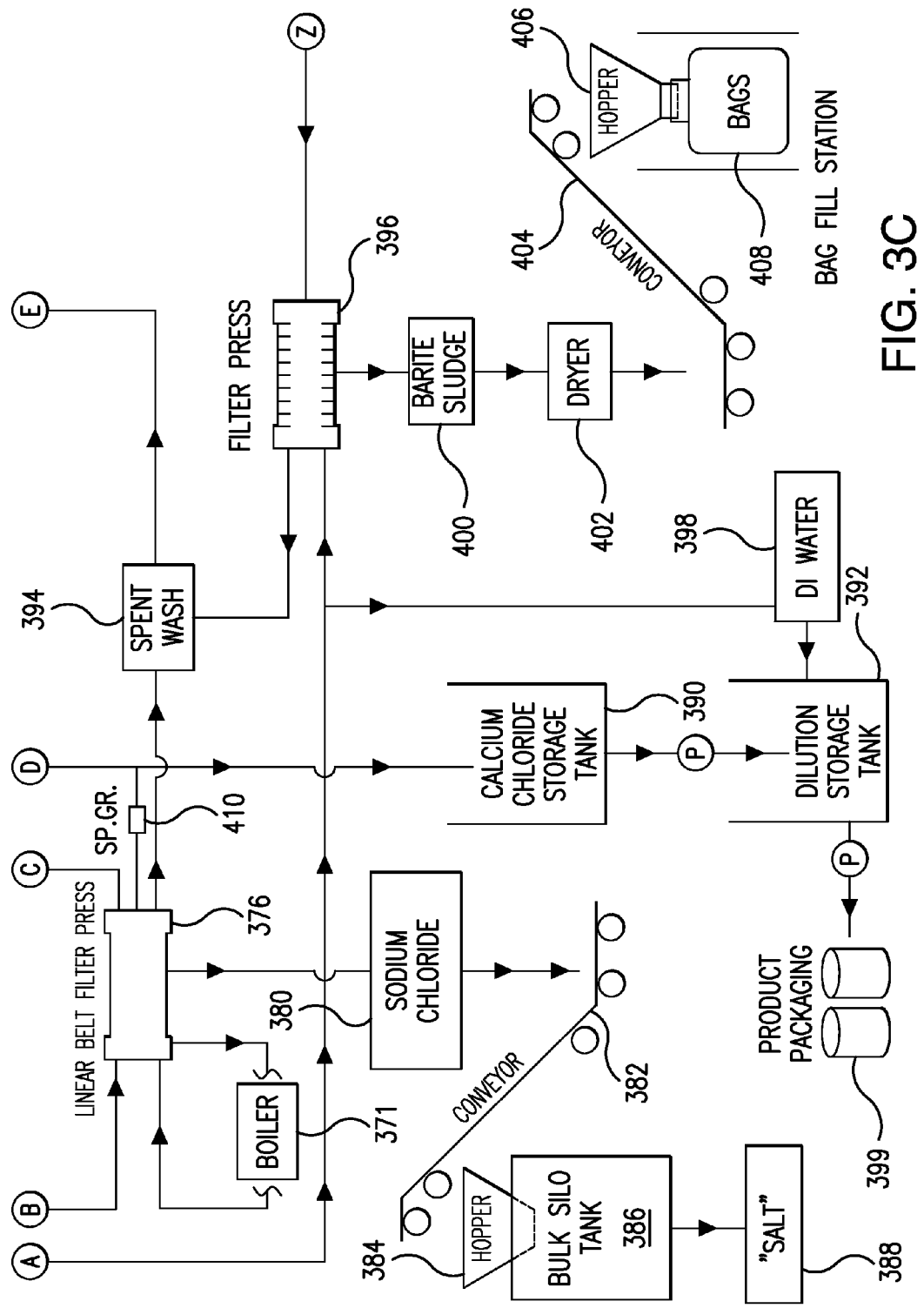

FIGS. 3A-3C are collectively a process flow diagram showing an exemplary processing method and system according to yet another embodiment of the present invention. The partial flow diagram shown in FIG. 3A connects to the partial flow diagram shown in FIG. 3B along flow lines X and Y. The partial flow diagram shown in FIG. 3A connects to the partial flow diagram shown in FIG. 3C along flow line Z. The partial flow diagram shown in FIG. 3B connects to the partial flow diagram shown in FIG. 3C along flow lines A-E. The flow diagram shown in FIGS. 3A-3C depicts both the system components and method components of the present invention. The process begins at unloading docks 320 where wastewater can be delivered to the system, for example, by tanker trucks. The unloading docks shown are exemplified as comprising docks for six tanker trucks. The unloading dock can be diked. Wastewater unloaded from the tankers at the unloading docks can be moved to a dual separator 324 that can initially separate solids and tramp oil from the wastewater. Separated solids can be moved to a solids receptacle or vessel 328, and separated tramp oil can be moved to a receptacle or vessel 330. The treated wastewater is then moved from dual separator 324 to one or more aerated storage equalization tanks.

In the exemplary embodiment shown in FIGS. 3A-3C, two aerated storage equalization tanks are used, 332 and 334. Each tank 332 and 334 can independently hold 10,000 gallons or more, for example, 50,000 gallons or more, 100,000 gallons or more, or, as exemplified, 300,000 gallons. After an appropriate aeration treatment, the treated wastewater or a portion thereof can be moved from tanks 332 and 334 to a first mix tank 336 where the wastewater can be mixed with an acid and an oxidizing agent. In the embodiment exemplified, the wastewater is mixed in mix tank 336 with a solution of 98% by weight sulfuric acid pumped into mix tank 336 from a vessel 338. A separately supplied source of potassium permanganate can be pumped or otherwise supplied from a vessel 340 into mix tank 336. Although hydrogen peroxide can be used instead of potassium permanganate, the use of potassium permanganate has been found to provide superior results as an oxidizing agent. After mixing is enabled in mix tank 336, the mixed and treated wastewater can then be moved to a second mix tank 342 where it can be mixed with an alkaline reagent, for example, as shown, a 50% solution of sodium hydroxide pumped in from a vessel 344. Although 50% sodium hydroxide is exemplified, any suitable non-toxic alkaline reagent can be used. After mixing with the sodium hydroxide in mix tank 342, the treated liquid can then be moved to a third mix tank 346 wherein the liquid can be treated with a flocculating agent, for example, PCT 8727 (available from ProChemTech International, Inc., of Brockway, Pa.). The flocculating agent can be pumped in from a vessel 348. After a treatment period that is sufficient to enable flocculation in mix tank 346, the liquid is then moved to an inclined plate clarifier 350 to separate the slurry into a clarified brine and a barite sludge. The slurry in inclined plate clarifier 350 can be recycled back to mix tank 336, as shown. For example, the slurry, including precipitated barium sulfate, can be recycled from inclined plate clarifier 350 along a recycle line 351 and returned to mix tank 336 for another round of mix tank processing. Recycling such output from inclined plate clarifier 350 has been found to produce a superior crystalline structure in the recovered products generated from the system and method. After recycling, barite sludge exiting inclined plate clarifier 350 can be collected in barite sludge tank 352 and then subjected to further processing as described below.

Clarified liquid leaving inclined plate clarifier 350 can be received in a brine well tank 354. Brine from tank 354 can then be moved to a first heat exchanger 356 before being passed through to an evaporator crystallizer 358. A pH neutralization tank (not shown) positioned downstream of inclined plate clarifier 350 can be provided to increase the alkalinity of the brine before it is evaporated and crystallized. For example, sodium hydroxide can be added to the brine in a pH neutralization tank to obtain a pH of from about 6.5 to about 7.5, or between 6.5 and 7.5, before the brine reaches evaporator crystallizer 358. Adjusting the pH to be within such ranges has been determined to reduce corrosion of evaporator crystallizer 358 and related equipment utilized for further processing of the brine.

A recirculating heating system including a boiler 360 can be provided to heat the brine received in the evaporator crystallizer 358. As shown in FIG. 3B, heat in the form of heated water from the evaporator crystallizer 358 can be used by heat exchanger 356 to warm incoming brine. Water collected in evaporator crystallizer 358 can travel from heat exchanger 356 into a second heat exchanger 357 and can exit heat exchanger 357 in the form of distilled water that can be received in a distilled (DI) water tank 364. The boiler can be used to supply steam for the evaporator crystallizer, to heat air used to dry sodium chloride, to heat air used to dry barite sludge, to heat air used to dry other products in processes where the product is dried, or a combination thereof. In cases where a fluidized bed dryer is used to dry a product, such as sodium chloride, the source of heat for the fluidized bed dryer can also be steam from the boiler.

Heat exchanger 357 can be in thermal contact with a cooling tower 362. Cooling tower 362 can be replenished, as need, by a cooling tower makeup vessel 366. Water from DI water tank 364 can be pumped or otherwise fed into cooling tower makeup vessel 366, as needed. Any of a plurality of agents, reagents, and/or materials can be added to the stream of water as the stream is moved to cooling tower makeup vessel 366. For example, polymer makeup from a vessel 368, boiler makeup from a vessel 370, and potassium permanganate or another oxidizing agent from a vessel 372, can each independently be added to the stream of water, as needed, as the stream is moved from DI water tank 364 to cooling tower makeup vessel 366. Although not shown, water from water tank 364 and the various agents, reagents, and/or materials from vessel 368, 370, and 372, can be pumped to other components or parts of the system, for example, boiler makeup from 370 can be fed to one or more boilers in the system. One or more of the boilers in the system can be used to supply steam for the evaporator crystallizer, to heat air used to dry the sodium chloride, to heat air used to dry the barite sludge, to heat air used to dry other products in processes where the product is dried, or a combination thereof. In cases where a fluidized bed dryer is used to dry a product, such as sodium chloride, the source of heat for the fluidized bed dryer can also be steam from one or more of the boilers.

Sodium chloride can be removed from evaporator crystallizer 358 through a product line 359 and can be cooled by passing through a heat exchanger 374. Cooled product leaving heat exchanger 374 can then be fed into a linear belt filter press 376. Brine from brine makeup tank 378 can be pumped to linear belt filter press 376, for example, to wash crystalline sodium chloride product that is captured by linear belt filter press 376. A boiler 371 can be connected to linear belt filter press 376 through a recirculating circuit and can provide heat to the press. Sodium chloride separated by liner belt filter press 376 can be rinsed with brine makeup from vessel 378 and the rinse brine can be directed to a spent wash tank 394 before being moved to brine well tank 354. Thus, the liquid from evaporator crystallizer 358 can be dewatered from linear belt filter press 376, and recirculated to evaporator crystallizer 358, without being diluted by the brine from vessel 378.

After dewatering in linear belt filter press 376, sodium chloride product can be conveyed to and collected in a sodium chloride vessel 380, and from there they can be moved to a conveyor 382. Solid sodium chloride product can be moved along conveyor 382 to a hopper 384, and from hopper 384 into a bulk silo tank 386. Sodium chloride product from bulk silo tank 386 can be packaged in the form of a product 388 and hauled away by truck, rail car, or the like.

The sodium chloride product from evaporator crystallizer 358 can instead or also be recovered from the evaporation liquor by utilizing a hydrocyclone concentration of solids followed by a high speed centrifuge for solid product recovery. The centrifuge can be equipped to wash the recovered sodium chloride with saturated sodium chloride brine, for example, as described above, if required by product specifications. Recovered sodium chloride can then be dried, for example, using a fluidized bed dryer, prior to storage, packaging, and/or bulk shipment.

After removing sodium chloride crystalline product in linear belt filter press 376, the liquid from dewatering can then be tested in a specific gravity tester 410 to determine whether the liquid has a high enough concentration of calcium chloride to be collected as a product. For example, if the specific gravity is high enough to correspond to a concentration of 65% by weight or more, calcium chloride, then the concentrated calcium chloride liquid can be diverted to a calcium chloride storage tank 390 and from there pumped into a dilution storage tank 392. Calcium chloride solution in dilution storage tank 392 can be diluted with DI water supplied from DI water vessel 398 to achieve an exact concentration for product packaging and labeling. The resulting calcium chloride product 399 can then be sold. If the calcium chloride solution dewatered from and exiting linear belt filter press 376 is determined by the specific gravity tester 410 to be of insufficient concentration for final processing, the solution can then be returned to evaporator crystallizer 358 for further processing and concentrating.

For optional recovery of strontium sulfate and to produce a superior low strontium-content final calcium chloride product, an additional three (3) mix tanks, mix tanks 4, 5, and 6 (not shown), and an additional inclined plate clarifier (not shown), can be added to the system after, or immediately downsteam from, inclined plate clarifier 350, for sequential recovery of strontium sulfate. Such an additional sub-system is exemplified in FIG. 4 described below.

Referring again to FIG. 3A, barite sludge from barite sludge tank 352 can be pumped along pathway Z, through the continuation of pathway Z shown in FIG. 3C, and into a filter press 396 as shown in FIG. 3C. Barite sludge dewatered from filter press 396 can be collected in a vessel 400 and then moved to a dryer 402. Spent wash from dewatering in filter press 396 can be moved to spent wash vessel 394 and then moved into brine well tank 354 to be used and processed as discussed above. After drying in dryer 402, the barite sludge can be moved to and along a conveyor 404 to a hopper 406. Dried barite sludge exiting hopper 406 can be bagged at a bag fill station 408. It has been determined that the barium precipitation also removes substantially all iron, manganese, radium, and suspended solids from the wastewater being treated. These constituents are thus incorporated into the recovered barite sludge.

It has been discovered that the recovered barite sludge may be a salable product without dewatering and washing. In an alternative to the recovery process shown, recovered barite sludge can instead be further concentrated in a thickener and delivered, sold, or both, as a slurry. For example, the barite sludge can be concentrated in a thickener, and then stabilized by the addition of materials such as calcium lignin sulfonate, various polymers such as polyacrylate, combinations thereof, and the like. The stabilized product can then be pH-adjusted with various caustic materials such as sodium hydroxide, sodium silicate, a combination thereof, or the like. The final product can then be stored in a tank and delivered as a liquid slurry.

Figure 4:
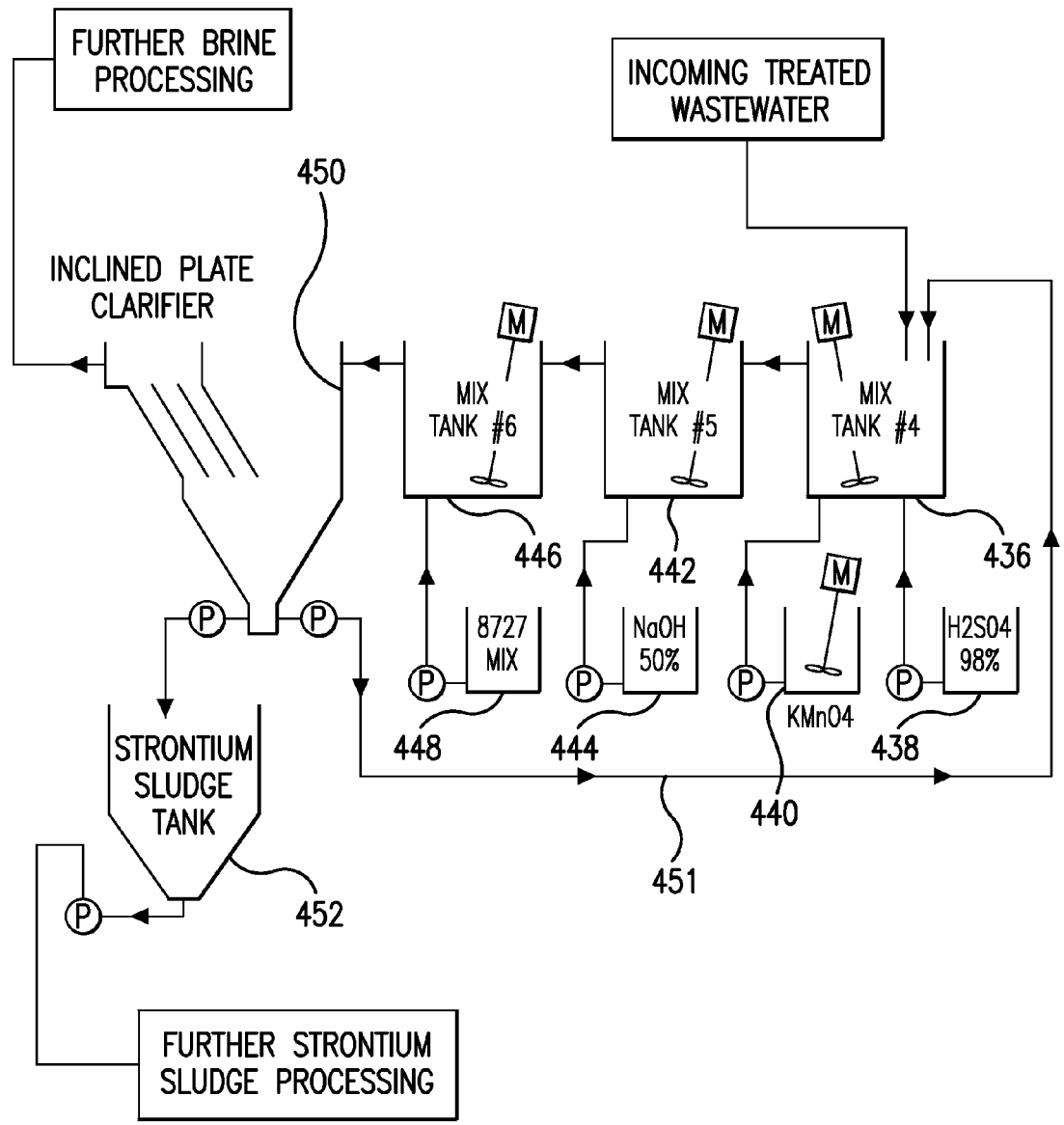
FIG. 4 is a schematic flow diagram of a wastewater treatment sub-system according to various embodiments of the present teachings, for recovering a strontium sulfate sludge and/or for removing strontium and providing a low strontium-content calcium chloride product.

If it is desired to recover a strontium sulfate sludge and/or to remove strontium and provide a low strontium-content calcium chloride product, and additional sub-system can be used, as exemplified in FIG. 4. As shown in FIG. 4, incoming treated wastewater, for example, exiting inclined plate clarifier 350 shown in FIG. 3A, can be moved or otherwise directed to a fourth mix tank, depicted in FIG. 4 as mix tank 436. Barium from the original wastewater can be substantially removed before incoming to mix tank 436. For example, if the sulfuric acid addition to mix tank 336 (FIG. 3A) is adjusted to provide an amount of sulfate ion that is equal to from about 100% to about 150% of a stoichiometrically equivalent amount of barium contained in the wastewater being treated in mix tank 336, substantially all of the barium can be precipitated as barium sulphate. Then, additional sulfuric acid can be added to mix tank 436 (FIG. 4) in an amount of from about 100% to about 150% of a stoichiometrically equivalent amount of strontium in the incoming wastewater being treated in mix tank 436. Mix tank 442 can then be used to adjust the pH, for example, to increase the pH. Mix tank 442 can be used to adjust the pH to be within the range of from about 6.5 to about 7.5, or to be between 6.5 and 7.5, by addition of sodium hydroxide or another alkaline or pH-adjusting reagent.

Mix tank 446 can be used to mix the wastewater with an anionic polymer to flocculate solids. Strontium sulfate can then be recovered in the additional inclined plate clarifier 450 and subsequently moved to and retained in a separate strontium sludge tank 452. The strontium sulfate sludge can then be washed, dewatered, and dried, for example, using a filter press and dryer. The dried strontium sulfate can then be bagged and sold as a bagged strontium sulfate product. Recycling of the slurry from inclined plate clarifier 450, containing precipitated strontium sulfate, back into mix tank 436 can be enabled by a recycle line 451. The extent of recycling can depend upon the crystalline structure desired in the recovered products, for example, in the subsequently generated sodium chloride. In the event that recovered barite is washed as part of the recovery process exemplified in FIGS. 3A-3C, spent barite cake wash water can be directed to mix tank 436 if strontium is to be recovered, for example, using the sub-system shown in FIG. 4.

Some wastewaters have been reported to contain significant amounts of both free and dissolved hydrocarbons. Various techniques can be employed to remove these constituents such as dissolved air floatation, with and without chemical emulsion breaking, and various membrane processes.

Dependent upon the specific process train employed and wastewater characteristics, distilled water may be produced in excess of facility needs and can thus be sold as an additional salable product.

The recovery process and system of the present invention are particularly useful in treating Marcellus deposit wastewaters, but can also be applied to wastewaters from other gas and oil shale plays. In some cases, the process and system can entail one or more additional pretreatment and/or concentration steps. The following Table 4 shows the levels of dissolved solids in wastewaters from some other shale plays.

TABLE 4

| Shale play | median total dissolved solids in mg/l |
| --- | --- |
| Anadarko | 132,200 |
| Denver | 10,200 |
| Permian | 89,200 |
| Williston | 132,400 |

Wastewaters with dissolved solids levels below 200,000 mg/l can be pre-concentrated using technologies such as the low temperature evaporation disclosed in U.S. Pat. No. 8,834,726 B2, which is incorporated herein in its entirety by reference. Other pre-treatment methods that can be used include higher temperature evaporation using a steam-heated kettle, a multiple effect vacuum unit, a vapor recompression apparatus, a combination thereof, or the like. When wastewater dissolved solids levels are below 50,000 mg/l, a membrane process such as a reverse osmosis process can be used.

EXAMPLES

Example 1

The wastewater treatment system and process described with reference to FIGS. 2A-2D were used on a typical Marcellus production wastewater and generated the results shown below in Table 5.

TABLE 5

| Parameter | Production Wastewater | Treated Brine | Produced Liquor |
| --- | --- | --- | --- |
| barium mg/l | 6,000 | 43 | 50 |
| bromide mg/l | 812 | 1.020 | 9,632 |
| calcium mg/l | 17,500 | 19,300 | 182,000 |
| lithium mg/l | 189 | 220 | 2,050 |
| magnesium mg/l | 1,800 | 1,540 | 14,750 |
| sodium mg/l | 80,000 | 55,500 | 2,600 |
| strontium mg/l | 3,600 | 1,280 | 10,100 |

As noted in U.S. patent application Ser. No. 12/620,019, the recovered barium sulfate, barite, from the first separation is a salable commodity. The crystalline sodium chloride obtained from the fractional crystallization step was recovered and compared with a commercial sodium chloride product as shown in Table 6 below.

TABLE 6

| Parameter | Commercial product | Crystalline product |
| --- | --- | --- |
| sodium chloride | minimum 97% | 98% |

Furthermore, the produced liquor, after filtration removal of the crystalline sodium chloride, met the specifications received for the commodity sale of technical calcium chloride solution.

Example 2

The wastewater treatment system and process described with reference to FIGS. 2A-2D were used on a second typical Marcellus production wastewater and generated the results shown below in Table 7.

TABLE 7

| Parameter | Production Wastewater | Treated Brine | Produced Liquor |
| --- | --- | --- | --- |
| barium mg/l | 325 | not detected | not detected |
| bromide mg/l | 2,660 | | 7,030 |
| calcium mg/l | 19,600 | 21,500 | 99,400 |
| lithium mg/l | 93.0 | | 440 |
| magnesium mg/l | 1,945 | 2,120 | 9,720 |
| sodium mg/l | 41,000 | 36,000 | 24,00 |
| strontium mg/l | 2,360 | 1,920 | 34,000 |

As noted in U.S. patent application Ser. No. 12/620,019, the recovered barium sulfate, barite, from the first separation is a salable commodity. Furthermore, the produced liquor, after filtration removal of the crystalline sodium chloride, met the specifications received for the commodity sale of technical calcium chloride solution. Produced crystalline sodium chloride was found to meet the specifications for sale as a commercial sodium chloride product.

Example 3

Fractional crystallization analyses and solubilities, as depicted in Table 8 below, shows how the solubility of sodium chloride decreases as the concentrations of calcium chloride and magnesium chloride increase.

TABLE 8

| Fractional Crystallization - NaCl, results as g/100 ml solution = % by weight | | | |
| --- | --- | --- | --- |
| Temperature C. | $CaCl_2$ | $MgCl_2$ | NaCl |
| 18 | 22.7 | 5.5 | 5.4 |
| 50 | 22.7 | 7.8 | 6.0 |
| 50 | 44.8 | 7.1 | 0.5 |
| 50 | 56.4 | 0 | 0.6 |
| 95 | 33.8 | 8.4 | 2.3 |
| 95 | 52.9 | 8.2 | 0.9 |
| 95 | 60.1 | 0 | 0.98 |
| 95 | 60.2 | 0 | 0 |

Thus, by evaporation, all three salts can be concentrated, but as the calcium and magnesium levels increase, the sodium chloride becomes less soluble and precipitates out of solution as a pure crystalline material. The solubility table shows that as the mixed salt solution is concentrated both sodium chloride and magnesium chloride can fractionally crystallize out of solution. Commercial product specifications, such as the two sets of specifications shown below, permit a substantial amount of magnesium in liquid calcium chloride products.

Commercial Product Specifications #1, for Liquid Calcium Chloride
$CaCl_2$—28 to 40%
NaCl—1.68 to 2.52%
$MgCl_2$—0.15 to 0.23%
Commercial Product Specifications #2, for Liquid Calcium Chloride
$CaCl_2$—28 to 40%
NaCl—1.0 to 3.5%
$MgCl_2$—0.8 to 3.4%

Thus, by minimizing only the sodium level, the process can produce a pure sodium chloride that can be sold as a commodity.

Table 8 enables an optimization of product recovery. For example, from Table 8 it can be seen that calcium chloride can be concentrated to a value of from about 52.9% to 60.1% calcium chloride, by weight, for example, about 55.5% by weight, to give a magnesium chloride value of less than 3% by weight and a sodium chloride value of less than 1.0% by weight at 95° C. Table 8 also shows that the method can be operated at 50° C., using heat recovery, to give an optimum calcium chloride concentration of 49.7% by weight or a range, for example, of from about 44.8% by weight to about 56.4% by weight.

The present invention includes the following numbered aspects, embodiments, and features, in any order and/or in any combination:

1. A method of treating a gas well hydrofracture flowback and/or production wastewater (production wastewater), comprising:
    contacting a production wastewater comprising barium, with a source of sulfate ions, in a first tank and under conditions to precipitate barium sulfate;
    precipitating barium sulfate from the production wastewater in the first tank to form a slurry of precipitated barium sulfate and a wastewater brine, the wastewater brine comprising sodium, magnesium, strontium, and calcium chlorides;
    moving the slurry to a second tank;
    mixing the slurry with a second reagent in the second tank;
    recycling the slurry to the first tank and repeating the precipitating, moving, and mixing to form a refined wastewater brine; and
    evaporating the refined wastewater brine to form water and evaporation products, the evaporation products comprising crystalline sodium chloride.
2. The method of any preceding or following embodiment/feature/aspect, wherein the evaporating further comprises forming a liquor comprising from about 25% by weight to about 60% by weight calcium chloride based on the total weight of the liquor.
3. The method of any preceding or following embodiment/feature/aspect, further comprising filtering the evaporation product to form a retentate comprising crystalline sodium chloride, and a filtrate comprising the liquor;
    washing the retentate with saturated sodium chloride brine; and
    drying the washed retentate.
4. The method of any preceding or following embodiment/feature/aspect, further comprising cooling the evaporation product prior to the filtering.
5. The method of any preceding or following embodiment/feature/aspect, further comprising measuring the specific gravity of the filtrate.
6. The method of any preceding or following embodiment/feature/aspect, further comprising:
    moving the refined wastewater brine to a third tank;
    adding from about 100% to about 150% of a stoichiometrically equivalent amount of sulfate ions to the third tank, based on the amount of strontium ions in the third tank; and
    precipitating strontium sulfate in the third tank.
7. The method of any preceding or following embodiment/feature/aspect, further comprising recovering and drying the precipitated strontium sulfate.
8. The method of any preceding or following embodiment/feature/aspect, wherein the contacting comprises:
    adding from about 100% to about 150% of a stoichiometrically equivalent amount of sulfate ions to the first tank, based on the amount of barium ions in the first tank.
9. The method of any preceding or following embodiment/feature/aspect, further comprising adjusting the pH of the refined wastewater brine to be between 6.5 and 7.5, before the evaporating.
10. The method of any preceding or following embodiment/feature/aspect, wherein the second reagent comprises a pH-adjustment reagent for increasing the pH of the slurry, and the method further comprises flocculating the slurry after mixing in the second tank and before recycling the slurry.
11. A method of treating a gas well hydrofracture flowback and/or production wastewater (production wastewater), comprising:
    contacting a production wastewater comprising barium, with a source of sulfate ions, in a first tank and under conditions to precipitate barium sulfate;
    precipitating barium sulfate from the production wastewater in the first tank to form a slurry of precipitated barium sulfate and a wastewater brine, the wastewater brine comprising sodium, magnesium, strontium, and calcium chlorides;
    moving the slurry to a second tank;
    mixing the slurry with a pH-adjusting reagent in the second tank to increase the pH of the slurry;
    removing the precipitated barium sulfate from the slurry to form a separated wastewater brine;
    moving the separated wastewater brine to a third tank;
    contacting the separated wastewater brine with a source of sulfate ions in the third tank and under conditions to precipitate strontium sulfate; and
    precipitating strontium sulfate from the separated wastewater brine.
12. The method of any preceding or following embodiment/feature/aspect, further comprising:
    removing precipitated strontium sulfate from the separated wastewater brine to form a refined wastewater brine; and
    evaporating the refined wastewater brine to form water and evaporation products, the evaporation products comprising crystalline sodium chloride.
13. The method of any preceding or following embodiment/feature/aspect, further comprising adjusting the pH of the refined wastewater brine to be between 6.5 and 7.5, before the evaporating.

14. The method of any preceding or following embodiment/feature/aspect, further comprising flocculating the slurry after mixing with the pH-adjusting reagent and before removing the precipitated barium sulfate.
15. The method of any preceding or following embodiment/feature/aspect, wherein the contacting comprises:
    adding from about 100% to about 150% of a stoichiometrically equivalent amount of sulfate ions to the first tank, based on the amount of barium ions in the first tank.
16. The method of any preceding or following embodiment/feature/aspect, further comprising:
    moving the refined wastewater brine to a third tank;
    adding from about 100% to about 150% of a stoichiometrically equivalent amount of sulfate ions to the third tank, based on the amount of strontium ions in the third tank; and
    precipitating strontium sulfate in the third tank.
17. The method of any preceding or following embodiment/feature/aspect, further comprising adding potassium permanganate to the first tank while contacting the production wastewater with the source of sulfate ions.
18. A method of treating a gas well hydrofracture flowback and/or production wastewater (production wastewater), comprising:
    contacting a production wastewater comprising barium, with a source of sulfate ions, in a first tank and under conditions to precipitate barium sulfate;
    precipitating barium sulfate from the production wastewater in the first tank to form a slurry of precipitated barium sulfate and a wastewater brine, the wastewater brine comprising sodium, magnesium, strontium, and calcium chlorides;
    moving the slurry to a second tank;
    mixing the slurry with a pH-adjusting reagent in the second tank to increase the pH of the slurry;
    removing the precipitated barium sulfate from the slurry, in the form of a barite sludge;
    concentrating the barite sludge;
    stabilizing the barite sludge; and
    increasing the pH of the barite sludge.
19. The method of any preceding or following embodiment/feature/aspect, wherein the concentrating comprises concentrating the barite sludge in a thickener.
20. The method of any preceding or following embodiment/feature/aspect, wherein the stabilizing comprises adding calcium lignin sulfonate, polyacrylate, another polymer, or a combination thereof, to the barite sludge.
21. The method of any preceding or following embodiment/feature/aspect, wherein, after the concentrating, the stabilizing, and the increasing the pH, the resulting barite sludge is in the form of a liquid slurry, and the method further comprises packaging the liquid slurry in a storage tank.

The present invention can include any combination of these various features or embodiments above and/or below as set-forth in the complete sentences and/or in individual clauses taken therefrom. Any combination of disclosed features herein is considered part of the present invention and no limitation is intended with respect to combinable features.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present teachings will be apparent to those skilled in the art from consideration of the present specification and practice of the present teachings disclosed herein. It is intended that the present specification and examples be considered exemplary only.

What is claimed is:
1. A method of treating a gas well hydrofracture flowback and/or production wastewater (production wastewater), comprising:
    Placing a production wastewater comprising an amount of barium ions into a first tank;
    Adjusting the pH of the production wastewater in the first tank to be within the range of from 3.0 to 3.5 and maintaining an oxidized condition, to form a pH-adjusted production wastewater comprising barium:
    Contacting the pH-adjusted production wastewater comprising barium, with a source of sulfate ions, in the first tank and under conditions to precipitate barium sulfate, the source of sulfate ions comprising an amount of sulfate ions that is stoichiometrically equivalent to from about 100% to about 150% based on the amount of barium ions in the first tank;
    Precipitating barium sulfate from the pH-adjusted production wastewater in the first tank to form a slurry of precipitated barium sulfate and a wastewater brine, the wastewater brine comprising sodium, magnesium, strontium, and calcium chlorides;
    Moving the slurry to a second tank;
    Mixing the slurry with an alkaline agent in the second tank;
    Clarifying the slurry on an inclined plate clarifier to form a clarified brine and barite sludge comprising precipitated barium sulfate;
    Recycling the clarified slurry, including precipitated barium sulfate, to the first tank and repeating the adjusting, contacting, precipitating, moving, mixing, and clarifying to form a clarified wastewater brine;
    Moving the clarified wastewater brine to a third tank;
    Adding sulfate ions to the third tank;
    Precipitating strontium sulfate in the third tank; and
    Evaporating the clarified wastewater brine to form water and evaporation products, the evaporation products comprising crystalline sodium chloride.
2. The method of claim 1, wherein the evaporating further comprises forming a liquor comprising from about 25% by weight to about 60% by weight calcium chloride based on the total weight of the liquor.
3. The method of claim 2, further comprising filtering the evaporation product to form a retentate comprising crystalline sodium chloride, and a filtrate comprising the liquor;
    washing the retentate with saturated sodium chloride brine; and
    drying the washed retentate.
4. The method of claim 3, further comprising cooling the evaporation products prior to the filtering.
5. The method of claim 1, further comprising measuring the specific gravity of the evaporation products after filtering.

6. The method of claim 1, further comprising recovering and drying the precipitated strontium sulfate.

7. The method of claim 1, further comprising adjusting the pH of the clarified wastewater brine to be between 6.5 and 7.5, before the evaporating.

8. The method of claim 1, wherein the method further comprises flocculating the slurry after mixing in the second tank and before recycling the barite sludge.

9. A method of treating a gas well hydrofracture flowback and/or production wastewater (production wastewater), comprising:
  placing a production wastewater comprising an amount of barium ions into a first tank;
  adjusting the pH of the production wastewater in the first tank to be within the range of from 3.0 to 3.5 and maintaining an oxidized condition, to form a pH-adjusted production wastewater comprising barium;
  contacting the pH-adjusted production wastewater comprising barium, with a source of sulfate ions, in the first tank and under conditions to precipitate barium sulfate, the source of sulfate ions comprising an amount of sulfate ions that is stoichiometrically equivalent to from about 100% to about 150% based on the amount of barium ions in the first tank;
  precipitating barium sulfate from the pH-adjusted production wastewater in the first tank to form a slurry of precipitated barium sulfate and a wastewater brine, the wastewater brine comprising sodium, magnesium, strontium, and calcium chlorides;
  moving the slurry to a second tank;
  mixing the slurry with a pH-adjusting reagent in the second tank to increase the pH of the slurry;
  removing the precipitated barium sulfate from the slurry to form a separated wastewater brine having an amount of strontium ions;
  moving the separated wastewater brine to a third tank;
  contacting the separated wastewater brine with a second source of sulfate ions in the third tank and under conditions to precipitate strontium sulfate; and
  precipitating strontium sulfate from the separated wastewater brine.

10. The method of claim 9, further comprising:
  removing precipitated strontium sulfate from the separated wastewater brine to form a refined wastewater brine; and
  evaporating the refined wastewater brine to form water and evaporation products, the evaporation products comprising crystalline sodium chloride.

11. The method of claim 10, further comprising adjusting the pH of the refined wastewater brine to be between 6.5 and 7.5, before the evaporating.

12. The method of claim 9, further comprising flocculating the slurry after mixing with the pH-adjusting reagent and before removing the precipitated barium sulfate.

13. The method of claim 9, further comprising adding potassium permanganate to the first tank while contacting the pH-adjusted production wastewater with the source of sulfate ions.

* * * * *